US007976379B2

(12) United States Patent
Baerlocher

(10) Patent No.: US 7,976,379 B2
(45) Date of Patent: Jul. 12, 2011

(54) GAMING SYSTEM AND METHOD HAVING CONFIGURABLE BONUS GAME TRIGGERING OUTCOMES

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 480 days.

(21) Appl. No.: 12/268,841

(22) Filed: Nov. 11, 2008

(65) Prior Publication Data

US 2009/0124346 A1 May 14, 2009

Related U.S. Application Data

(63) Continuation-in-part of application No. 12/029,795, filed on Feb. 12, 2008.

(60) Provisional application No. 60/986,772, filed on Nov. 9, 2007.

(51) Int. Cl.
*G06F 17/00* (2006.01)

(52) U.S. Cl. ........................................................ 463/20

(58) Field of Classification Search ............... 463/16–25
See application file for complete search history.

(56) References Cited

U.S. PATENT DOCUMENTS

| | | | |
|---|---|---|---|
| 4,669,731 | A | 6/1987 | Clarke |
| 4,991,848 | A | 2/1991 | Greenwood et al. |
| 5,116,055 | A | 5/1992 | Tracy |
| 5,542,669 | A | 8/1996 | Charron et al. |
| 5,564,700 | A | 10/1996 | Celona |
| 5,580,309 | A | 12/1996 | Piechowiak et al. |
| 5,611,730 | A | 3/1997 | Weiss |
| 5,655,961 | A | 8/1997 | Acres et al. |
| 5,766,076 | A | 6/1998 | Pease et al. |
| 5,833,537 | A | 11/1998 | Barrie |
| 5,855,515 | A | 1/1999 | Pease et al. |
| 5,885,158 | A | 3/1999 | Torango et al. |
| 6,012,982 | A | 1/2000 | Piechowiak et al. |
| 6,068,552 | A | 5/2000 | Walker et al. |
| 6,162,121 | A | 12/2000 | Morro et al. |
| 6,168,523 | B1 | 1/2001 | Piechowiak et al. |
| 6,217,448 | B1 | 4/2001 | Olsen |
| 6,231,445 | B1 | 5/2001 | Acres |
| 6,334,614 | B1 | 1/2002 | Breeding |

(Continued)

FOREIGN PATENT DOCUMENTS

WO WO 00/32286 6/2000

(Continued)

OTHER PUBLICATIONS

An Introduction to Server Based Gaming, written by IGT, published in Feb. 2006.

(Continued)

*Primary Examiner* — Ronald Laneau
(74) *Attorney, Agent, or Firm* — K&L Gates LLP

(57) ABSTRACT

A gaming system and method which provides for one or more gaming device triggered bonus games to be skipped or otherwise not provided to the players at the gaming devices which triggered such bonus games. The average expected payouts of skipped gaming device triggered bonus games are contributed to a bonus accumulation pool or fund. The accumulation pool is subsequently utilized to provide one or more gaming system triggered bonuses to one or more players at one or more of the gaming devices in the gaming system. A player's accumulated triggering symbols determine, at least in part, the player's probability of winning part of the bonus accumulation pool and/or the player's portion of the bonus accumulation pool.

22 Claims, 15 Drawing Sheets

U.S. PATENT DOCUMENTS

| | | | |
|---|---|---|---|
| 6,336,863 | B1 | 1/2002 | Baerlocher et al. |
| 6,343,989 | B1 | 2/2002 | Wood et al. |
| 6,375,187 | B1 | 4/2002 | Baerlocher |
| 6,386,974 | B1 | 5/2002 | Adams |
| 6,390,473 | B1 | 5/2002 | Vancura et al. |
| 6,435,511 | B1 | 8/2002 | Vancura et al. |
| RE37,885 | E | 10/2002 | Acres et al. |
| 6,494,785 | B1 | 12/2002 | Gerrard et al. |
| 6,506,118 | B1 | 1/2003 | Baerlocher et al. |
| 6,514,141 | B1 | 2/2003 | Kaminkow et al. |
| 6,554,283 | B2 | 4/2003 | Vancura et al. |
| 6,554,704 | B2 | 4/2003 | Nicastro et al. |
| 6,569,015 | B1 | 5/2003 | Baerlocher et al. |
| 6,572,472 | B1 | 6/2003 | Glavich |
| 6,599,192 | B1 | 7/2003 | Baerlocher et al. |
| 6,599,193 | B2 | 7/2003 | Baerlocher et al. |
| 6,602,136 | B1 | 8/2003 | Baerlocher et al. |
| 6,632,141 | B2 | 10/2003 | Webb et al. |
| 6,648,754 | B2 | 11/2003 | Baerlocher et al. |
| 6,692,005 | B2 | 2/2004 | Vancura et al. |
| 6,692,355 | B2 | 2/2004 | Baerlocher et al. |
| 6,719,632 | B2 | 4/2004 | Palmer et al. |
| 6,722,981 | B2 | 4/2004 | Kaminkow et al. |
| 6,722,982 | B2 | 4/2004 | Kaminkow et al. |
| 6,726,563 | B1 | 4/2004 | Baerlocher et al. |
| 6,758,750 | B2 | 7/2004 | Baerlocher et al. |
| 6,783,455 | B2 | 8/2004 | Glavich |
| 6,786,819 | B2 | 9/2004 | Baerlocher et al. |
| 6,786,820 | B2 | 9/2004 | Gerrard et al. |
| 6,793,579 | B2 | 9/2004 | Baerlocher et al. |
| 6,796,905 | B2 | 9/2004 | Baerlocher et al. |
| 6,808,452 | B2 | 10/2004 | Baerlocher et al. |
| 6,808,454 | B2 | 10/2004 | Gerrard et al. |
| 6,811,473 | B2 | 11/2004 | Heimes et al. |
| 6,852,030 | B2 | 2/2005 | Baerlocher et al. |
| 6,890,257 | B2 | 5/2005 | Baerlocher |
| 6,899,623 | B2 | 5/2005 | Baerlocher |
| 6,908,383 | B2 | 6/2005 | Baerlocher |
| 6,942,566 | B2 | 9/2005 | Baerlocher et al. |
| 6,942,567 | B2 | 9/2005 | Baerlocher et al. |
| RE38,812 | E | 10/2005 | Acres et al. |
| 6,955,600 | B2 | 10/2005 | Glavich et al. |
| 6,960,132 | B2 | 11/2005 | Baerlocher et al. |
| 6,966,833 | B2 | 11/2005 | Kaminkow et al. |
| 6,966,834 | B1 | 11/2005 | Johnson |
| 6,971,953 | B2 | 12/2005 | Gerrard et al. |
| 6,988,947 | B2 | 1/2006 | Baerlocher et al. |
| 7,000,921 | B2 | 2/2006 | Schultz |
| 7,001,273 | B2 | 2/2006 | Baerlocher |
| 7,040,984 | B2 | 5/2006 | Mead |
| 7,048,628 | B2 * | 5/2006 | Schneider ....................... 463/16 |
| 7,056,215 | B1 | 6/2006 | Olive |
| 7,070,501 | B2 | 7/2006 | Cormack et al. |
| 7,111,845 | B2 | 9/2006 | Walker et al. |
| 7,144,321 | B2 | 12/2006 | Mayeroff |
| 7,160,186 | B2 | 1/2007 | Cuddy et al. |
| 7,192,349 | B2 | 3/2007 | Baerlocher et al. |
| 7,223,172 | B2 | 5/2007 | Baerlocher et al. |
| 7,235,010 | B2 | 6/2007 | Baerlocher |
| 7,250,001 | B2 | 7/2007 | Baerlocher et al. |
| 7,264,545 | B2 | 9/2007 | Maya et al. |
| 7,270,604 | B2 | 9/2007 | Gerrard et al. |
| 7,291,066 | B2 | 11/2007 | Gauselmann |
| 7,311,598 | B2 | 12/2007 | Kaminkow et al. |
| 7,311,604 | B2 | 12/2007 | Kaminkow et al. |
| 7,326,114 | B2 | 2/2008 | Webb et al. |
| 7,331,864 | B2 | 2/2008 | Baerlocher |
| 7,335,102 | B2 | 2/2008 | Baerlocher et al. |
| 7,351,140 | B2 | 4/2008 | Wolf et al. |
| 7,364,507 | B2 | 4/2008 | Baerlocher et al. |
| 7,407,435 | B2 | 8/2008 | Baerlocher et al. |
| 7,416,485 | B2 | 8/2008 | Walker et al. |
| 7,427,236 | B2 | 9/2008 | Kaminkow et al. |
| 7,448,949 | B2 | 11/2008 | Kaminkow et al. |
| 7,470,184 | B2 | 12/2008 | Baerlocher et al. |
| 7,654,896 | B2 * | 2/2010 | Baerlocher ..................... 463/16 |
| 7,666,081 | B2 * | 2/2010 | Baerlocher et al. ............. 463/16 |
| 7,674,180 | B2 * | 3/2010 | Graham et al. ................. 463/29 |
| 2002/0022509 | A1 | 2/2002 | Nicastro et al. |
| 2003/0040355 | A1 | 2/2003 | Baerlocher et al. |
| 2003/0078093 | A1 | 4/2003 | Simms et al. |
| 2003/0162584 | A1 | 8/2003 | Hughs-Baird et al. |
| 2003/0186733 | A1 | 10/2003 | Wolf et al. |
| 2003/0216166 | A1 | 11/2003 | Baerlocher et al. |
| 2003/0236116 | A1 | 12/2003 | Marks et al. |
| 2004/0048644 | A1 | 3/2004 | Gerrard et al. |
| 2004/0106444 | A1 | 6/2004 | Cuddy et al. |
| 2004/0152509 | A1 | 8/2004 | Hornik et al. |
| 2004/0180710 | A1 | 9/2004 | Palmer et al. |
| 2004/0266516 | A1 | 12/2004 | Thomas |
| 2004/0266517 | A1 | 12/2004 | Bleich et al. |
| 2005/0020342 | A1 | 1/2005 | Palmer et al. |
| 2005/0032567 | A1 | 2/2005 | Baerlocher et al. |
| 2005/0037829 | A1 | 2/2005 | Baerlocher et al. |
| 2005/0054413 | A1 | 3/2005 | Randall et al. |
| 2005/0054436 | A1 | 3/2005 | Frizzell et al. |
| 2005/0101375 | A1 | 5/2005 | Webb et al. |
| 2005/0130729 | A1 | 6/2005 | Baerlocher et al. |
| 2005/0130731 | A1 | 6/2005 | Englman et al. |
| 2005/0143170 | A1 | 6/2005 | Maya et al. |
| 2005/0181860 | A1 | 8/2005 | Nguyen et al. |
| 2005/0215314 | A1 | 9/2005 | Schneider et al. |
| 2006/0003837 | A1 | 1/2006 | Baerlocher et al. |
| 2006/0025195 | A1 | 2/2006 | Pennington et al. |
| 2006/0030403 | A1 | 2/2006 | Lafky et al. |
| 2006/0035694 | A1 | 2/2006 | Fuller |
| 2006/0035696 | A1 | 2/2006 | Walker et al. |
| 2006/0040723 | A1 | 2/2006 | Baerlocher et al. |
| 2006/0040732 | A1 | 2/2006 | Baerlocher et al. |
| 2006/0040733 | A1 | 2/2006 | Baerlocher et al. |
| 2006/0040734 | A1 | 2/2006 | Baerlocher et al. |
| 2006/0040736 | A1 | 2/2006 | Baerlocher et al. |
| 2006/0089194 | A1 | 4/2006 | Joshi et al. |
| 2006/0094509 | A1 | 5/2006 | Michaelson et al. |
| 2006/0116194 | A1 | 6/2006 | Pacey et al. |
| 2006/0121966 | A1 | 6/2006 | Baerlocher |
| 2006/0160620 | A1 | 7/2006 | Matthews et al. |
| 2006/0172791 | A1 | 8/2006 | Wolf |
| 2006/0178203 | A1 | 8/2006 | Hughes et al. |
| 2006/0183535 | A1 | 8/2006 | Marks et al. |
| 2006/0252506 | A1 | 11/2006 | Walker et al. |
| 2007/0032286 | A1 | 2/2007 | Muir |
| 2007/0054733 | A1 | 3/2007 | Baerlocher et al. |
| 2007/0060246 | A1 | 3/2007 | Baerlocher et al. |
| 2007/0060271 | A1 | 3/2007 | Cregan et al. |
| 2007/0060292 | A1 | 3/2007 | Peterson |
| 2007/0060297 | A1 | 3/2007 | Hein et al. |
| 2007/0060314 | A1 | 3/2007 | Baerlocher et al. |
| 2007/0060321 | A1 | 3/2007 | Vasquez et al. |
| 2007/0077979 | A1 | 4/2007 | Cohn et al. |
| 2007/0077981 | A1 | 4/2007 | Hungate et al. |
| 2007/0077990 | A1 | 4/2007 | Cuddy et al. |
| 2007/0105619 | A1 | 5/2007 | Kniesteadt et al. |
| 2007/0105620 | A1 | 5/2007 | Cuddy et al. |
| 2007/0129131 | A1 | 6/2007 | Kaminkow et al. |
| 2007/0149292 | A1 | 6/2007 | Kaminkow et al. |
| 2007/0155466 | A1 | 7/2007 | Baerlocher et al. |
| 2007/0155480 | A1 | 7/2007 | Brosnan et al. |
| 2007/0155485 | A1 | 7/2007 | Cuddy et al. |
| 2007/0167208 | A1 | 7/2007 | Acres |
| 2007/0167217 | A1 | 7/2007 | Macvittie et al. |
| 2007/0184887 | A1 | 8/2007 | Cannon |
| 2007/0191088 | A1 | 8/2007 | Breckner et al. |
| 2007/0207850 | A1 | 9/2007 | Darrah et al. |
| 2007/0218975 | A1 | 9/2007 | Iddings et al. |
| 2007/0218982 | A1 | 9/2007 | Baerlocher et al. |
| 2007/0259711 | A1 | 11/2007 | Thomas |
| 2007/0298872 | A1 | 12/2007 | Gerrard et al. |
| 2007/0298874 | A1 | 12/2007 | Baerlocher et al. |
| 2007/0298875 | A1 | 12/2007 | Baerlocher et al. |
| 2008/0020817 | A1 | 1/2008 | Kaminkow et al. |
| 2008/0020822 | A1 | 1/2008 | Cuddy et al. |
| 2008/0020823 | A1 | 1/2008 | Cuddy et al. |
| 2008/0020824 | A1 | 1/2008 | Cuddy et al. |
| 2008/0020825 | A1 | 1/2008 | Cuddy et al. |
| 2008/0020829 | A1 | 1/2008 | Baerlocher |
| 2008/0020830 | A1 | 1/2008 | Ikehara et al. |

| | | | | |
|---|---|---|---|---|
| 2008/0020831 | A1 | 1/2008 | Ikehara et al. | |
| 2008/0020832 | A1 | 1/2008 | Iddings et al. | |
| 2008/0020833 | A1 | 1/2008 | Baerlocher et al. | |
| 2008/0020834 | A1 | 1/2008 | Breckner et al. | |
| 2008/0020846 | A1 | 1/2008 | Vasquez et al. | |
| 2008/0020847 | A1 | 1/2008 | Kniesteadt et al. | |
| 2008/0051168 | A1 | 2/2008 | Kaminkow et al. | |
| 2008/0070676 | A1 | 3/2008 | Baerlocher et al. | |
| 2008/0070677 | A1 | 3/2008 | Baerlocher et al. | |
| 2008/0070678 | A1 | 3/2008 | Baerlocher et al. | |
| 2008/0070702 | A1 | 3/2008 | Kaminkow et al. | |
| 2008/0081690 | A1 | 4/2008 | Baerlocher et al. | |
| 2008/0081691 | A1 | 4/2008 | Baerlocher et al. | |
| 2008/0102916 | A1 | 5/2008 | Kovacs | |
| 2008/0102920 | A1 | 5/2008 | Baerlocher et al. | |
| 2008/0108401 | A1 | 5/2008 | Baerlocher et al. | |
| 2008/0108423 | A1 | 5/2008 | Benbrahim et al. | |
| 2008/0108429 | A1 | 5/2008 | Davis et al. | |
| 2008/0113763 | A1 | 5/2008 | Michaelson et al. | |
| 2008/0113765 | A1 | 5/2008 | DeWaal | |
| 2008/0113768 | A1 | 5/2008 | Baerlocher | |
| 2008/0113770 | A1 | 5/2008 | Gelber et al. | |
| 2008/0113771 | A1 | 5/2008 | Baerlocher et al. | |
| 2008/0139274 | A1 | 6/2008 | Baerlocher et al. | |
| 2008/0139290 | A1 | 6/2008 | Kniesteadt et al. | |
| 2008/0153564 | A1 | 6/2008 | Baerlocher et al. | |
| 2008/0176650 | A1 | 7/2008 | Wolf et al. | |
| 2008/0214263 | A1 * | 9/2008 | Walker et al. | 463/16 |
| 2008/0300051 | A1 | 12/2008 | Walker et al. | |

FOREIGN PATENT DOCUMENTS

| | | |
|---|---|---|
| WO | WO 2006/005073 | 1/2006 |
| WO | WO 2006/044252 | 4/2006 |
| WO | WO 2006/130611 | 12/2006 |
| WO | WO 2007/117502 | 10/2007 |
| WO | WO 2007/130464 | 11/2007 |
| WO | WO 2007/139874 | 12/2007 |
| WO | WO 2007/139988 | 12/2007 |
| WO | WO 2008/048634 | 4/2008 |

OTHER PUBLICATIONS

SB Products—The Next Big Innovation, printed from www.igt.com in Aug. 2006.

Server Based: Other Possibilities Article; published by www.casinocenter.com in May 2006.

Transforming Gaming brochure, written by Cyberview Technology, published in 2006.

* cited by examiner

FIG. 10

| Player | Number of Skipped Gaming Device Triggered Bonus Games for First Round | Average Expected Payout of Each Skipped Gaming Device Triggered Bonus Game | Continuation to Maintained Bonus Accumulation Pool | Quantity of Accumulated Triggering Symbols for First Round | Target Quantity of Accumulated Triggering Symbols for First Round | Accumulated Game Award Offer for First Round |
|---|---|---|---|---|---|---|
| A | 2 | $50.00 | $100.00 | 4 | 3 | $10.00 |
| B | 1 | $50.00 | $50.00 | 3 | 3 | $10.00 |
| C | 2 | $50.00 | $100.00 | 3 | 3 | $10.00 |
| D | 0 | $50.00 | $0 | 0 | 3 | |
| E | 0 | $50.00 | $0 | 0 | 3 | |
| F | 1 | $50.00 | $50.00 | 1 | 3 | |
| G | 1 | $50.00 | $50.00 | 3 | 3 | $10.00 |
| H | 1 | $50.00 | $50.00 | 2 | 3 | |

FIG. 11

| Player | Amount in Maintained Bonus Accumulation Pool at Conclusion of Round | Percentage of Maintained Bonus Accumulation Pool Offered to Players as Accumulated Game Awards | Target Quantity of Accumulated Triggering Symbols | Number of Players Reaching Target Quantity of Accumulated Triggering Symbols | Portion of Maintained Bonus Accumulation Pool Offered to Players as Accumulated Game Awards | Accumulated Game Award Per Player |
|---|---|---|---|---|---|---|
| 1 | $400.00 | 10% | 3 | 4 | $40.00 | $10.00 |
| 2 | $600.00 | 25% | 5 | 3 | $150.00 | $50.00 |
| 3 | $700.00 | 45% | 7 | 3 | $310.50 | $105.00 |
| 4 | $800.00 | 70% | 9 | 2 | $560.00 | $280.00 |
| 5 | $900.00 | 100% | 10 | 1 | $900.00 | $900.00 |

GAMING SYSTEM AND METHOD HAVING CONFIGURABLE BONUS GAME TRIGGERING OUTCOMES

PRIORITY CLAIM

This application is continuation-in-part application of, claims priority to and the benefit of U.S. patent application Ser. No. 12/029,795, filed on Feb. 12, 2008, which is a non-provisional application of, claims priority to and the benefit of U.S. Provisional Patent Application Ser. No. 60/986,772, filed on Nov. 9, 2007, the entire contents of which are incorporated herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Symbols or symbol combinations which are less likely to occur usually provide higher awards.

Secondary or bonus games are also known in gaming machines. Secondary or bonus games usually do not require an additional wager by the player to be activated and provide an additional award, such as a bonus award, to the player. The awards provided for such secondary or bonus games are calculated into or taken into account in the total average expected payout percentage of the gaming machines. Thus, the total average expected payout percentage or the total gaming machine return of such known gaming machines is the average expected payback percentage of the base game plays plus the average expected payout percentage of the bonus game plays. In certain secondary or bonus games, the bonus game average expected payout percentage is around 30% of the total gaming machine return and varies within the range of 10% to 50% of the total gaming machine return. It should be appreciated that a great amount of time and cost are put into developing the paytables utilized in determining the total gaming machine return (i e., the paytables that account for the base game and any bonus games of the gaming machine).

In certain known gaming machines, secondary or bonus games are activated or triggered upon an occurrence of a symbol or symbol combination in the primary or base game. For instance, a symbol occurring on the payline on the third reel of a three reel slot machine may initiate a secondary bonus game. In the gaming machine software of these gaming machines, certain symbols or symbol combinations are identified or otherwise flagged. When an symbols or symbol combinations generated in the primary or base game are analyzed by the gaming machine's software, if a flag is associated with the analyzed symbols or symbol combinations, the gaming machine's software triggers the bonus or secondary game. That is, these gaming machines include symbol-driven secondary or bonus games which are triggered by the gaming machine. It should be appreciated that since these are game defined symbols or symbol combinations, the frequency and payouts are determined by the game's design and thus are considered an integral part of the game and the characteristic of the game.

Certain other known gaming machines trigger mystery bonus games (which provide mystery bonus awards) without any apparent reason to the player. That is, these gaming machines trigger and display a mystery bonus game (and provide a player any mystery bonus award in the mystery bonus game) independent of any displayed event in or based specifically on any of the displayed plays of any base game. Such mystery bonus awards typically account for a smaller contribution to the total gaming machine return and are considered separate from the primary or base game (i.e., these mystery bonus games are said to sit on top of any existing primary or base games and any existing symbol-driven bonus games). One example of a mystery bonus game includes enabling a player to play for one of a plurality of simultaneously maintained progressive awards arranged in a multi-level progressive ("MLP") configuration. It should be appreciated that these known mystery bonus games require the gaming machine's software to trigger such mystery bonus games and further to work in conjunction with any other symbol-driven bonus games.

Gaming system delivered or gaming system triggered mystery bonus games are also known. Gaming system mystery bonus games are triggered from a central server, central controller or remote host (i.e., independent from any gaming machine). Such gaming system mystery bonus games are configured to be delivered to or associated with any suitable game played on a suitable gaming machine in the gaming system without having special game software or code associated with these suitable gaming machines. However, these gaming system triggered mystery bonus games typically only add less than 1% to the gaming machine average expected total return. That is, a player would have to wager $100 to be provided an additional average bonus award of $1 as a gaming system mystery bonus award. Accordingly, such gaming system mystery bonus games usually require many gaming machines to be in the gaming system and a long time between payouts to offer substantial sized mystery bonus awards (which are generally offered to a few players at the expense of many players).

As gaming establishments move to a more server based network environment, there is a need to provide bonus awards that contribute a larger percentage to the total average expected return to players (i.e., similar to symbol-driven bonus awards) but which are delivered by a central server. There is also a need to provide bonus awards that are provided to many players and are configured to be delivered to many game types without having special game software or code associated the specific games (i.e., to setup the previously required flags). It should also be appreciated that one issue in designing such a gaming system is that most jurisdictions have regulations that require a gaming machine to return a minimum average expected payback percentage. This minimum average expected payback percentage typically varies from 75% to 88% depending on the jurisdiction, wherein the gaming machines (and in some cases, the base games of such gaming machines) must meet this minimum payback percentage to comply with such regulations. That is, if a gaming system based bonus is currently disabled, the total return of the gaming machine (with the disabled gaming system bonus game) must still meet these jurisdictional requirements. Accordingly, for this reason, any gaming system based bonus that awards more than 15% to 25% return to the player will require the gaming machine to have a total return greater than 100%. Thus, it is difficult to incorporate a gaming system based bonus with a bonus award that accounts for 30% of the total gaming machine return (like a typical symbol-driven game bonus).

Another issue with known gaming machines is that players often suffer from fatigue in playing the same gaming machines repeatedly. That is, certain known gaming machines have a relatively short life span in part because players get bored with the provided base and bonus games of such gaming machines and are intrigued by new gaming machines with new base and bonus games. For this reason, gaming machine manufacturers release hundreds of different gaming machines each year, wherein many of these gaming machines includes more than one type of base game or bonus game. In light of such a large number of gaming machines released each year, gaming establishments, such as casinos, continuously need to differentiate their products and games from those of neighboring gaming establishments. Accordingly, there is a need to enable such gaming establishments to offer unique bonus games to their players that are branded to the gaming establishment and build player loyalty to the gaming establishment. Such a gaming system needs to be provided in a way that does not burden the gaming machine manufacturers by having to develop an unreasonable amount of custom game programs or software and an unreasonable amount of content for each different gaming establishment.

There is also a continuing need to provide new and different gaming machines and gaming systems as well as new and different ways to provide awards to players including bonus awards.

SUMMARY

In various embodiments, the gaming system and method disclosed herein provides for one or more gaming device triggered bonus games to be skipped or otherwise not provided to the players at the gaming average expected payouts of skipped gaming device triggered bonus games are contributed to a bonus accumulation pool or fund. The bonus accumulation pool is subsequently utilized to provide one or more gaming system triggered bonuses to one or more players at one or more of the gaming devices in the gaming system. Accordingly, the gaming system disclosed herein provides for a gaming device triggered bonus game to be converted to a gaming system triggered bonus game, such as a gaming system triggered group bonus game. Such a configuration provides that the gaming system triggered bonus game contributes an increased percentage to the average expected total return to players (compared to known gaming system triggered bonus games) and is configured to be delivered to many types of gaming devices without having special game software associated with each gaming device.

In one embodiment, the gaming system disclosed herein includes a central server, central controller or remote host in communication with or linked to a plurality of gaming machines or gaming devices. In one such embodiment, the gaming system and method disclosed herein identifies or otherwise flags one or more bonus game triggering events, such as a symbol-driven bonus game triggering event or a mystery bonus game triggering event. In this embodiment, if the gaming device causes the flagged bonus game triggering event to occur, the gaming system (i.e., the gaming device processor or the central server) determines whether or not to provide the gaming device triggered bonus game. That is, the gaming system and method disclosed herein provides for one or more gaming device specific bonus game triggering events to be configurable to enable a play of the triggered bonus game or to withhold the play of the triggered bonus game. For example, if a flagged designated symbol combination is associated with a triggering of a bonus game, upon the gaming device generating and displaying the flagged designated symbol combination, the gaming device or the central server determines whether or not to provide the triggered bonus game to the player at the gaming device.

If the determination is to provide the gaming device triggered bonus game, the bonus game is displayed to a player at the gaming device and the gaming device provides the player any bonus game award. In one embodiment, if the determination is to skip the gaming device triggered bonus game, the gaming device provides the player any base game award associated with the bonus game triggering event (i.e., any award associated with the displayed symbols of a symbol-driven triggered bonus game) but does not display any bonus game to the player and does not provide the player any bonus game award.

In one embodiment, if the determination is to skip the gaming device triggered bonus game, the gaming device communicates data or information to the central server regarding the skipped bonus game, including but not limited to, the theoretical average expected payout of the skipped bonus game. In one embodiment, the theoretical average expected payout of the skipped bonus game funds a bonus accumulation pool maintained by the central server. For example, if a skipped bonus game is associated with an average expected payout of $50, then $50 is added to the bonus accumulation pool.

In another embodiment, the gaming system is configured to either provide the gaming device triggered bonus game for all occurrences of the bonus game triggering event or skip the gaming device triggered bonus game for all occurrences of the bonus game triggering event. That is, in this embodiment, rather than determining, for each occurrence of the bonus game triggering event, whether to provide the triggered bonus game or skip the triggered bonus game, the central server instructs the gaming devices to either provide the triggered bonus game for all occurrences of the bonus game triggering event or skip the triggered bonus game for all occurrences of the bonus game triggering event. In this embodiment, if the triggered bonus game is skipped, the gaming device communicates the average expected payout of the skipped bonus game to be contributed to a bonus accumulation pool as described herein. It should be appreciated that in this embodiment, if the central server instructs a gaming device to skip the gaming device triggered bonus game for all occurrences of the bonus game triggering event, the gaming device is associated with the gaming system triggered bonus to ensure that the gaming device complies with jurisdictional minimums for total gaming device returns.

In one embodiment, the gaming system and method disclosed herein continues determining whether to provide any gaming device triggered bonus games and funding the bonus accumulation pool until the central server determines to trigger a gaming system bonus. In one such embodiment, the central server determines to trigger the gaming system triggered bonus based on a displayed event in a play of one or more displayed games of one or more of the gaming devices in the gaming system. In another embodiment, the central server determines to trigger the gaming system triggered bonus independent of any displayed event in any play of any game of any of the gaming devices in the gaming system.

In one embodiment, upon the central server determining to trigger a gaming system bonus, the central server provides part or all of the value of the maintained bonus accumulation pool to one or more players at the gaming devices in the gaming system. That is, the central server utilizes a gaming system triggered bonus to redistribute the theoretical average expected payouts contributed from the skipped gaming device triggered bonus games. In one such embodiment, upon a determination to trigger a gaming system triggered bonus, the gaming system provides the bonus accumulation pool to one of the players at one of the gaming devices in the gaming system. In another such embodiment, upon a determination to trigger a gaming system triggered bonus, the gaming system provides each of a plurality of the players at a plurality of the gaming devices with a portion of the bonus accumulation pool. In this embodiment, the central server utilizes a gaming system triggered group bonus which is simultaneously provided to a plurality of players at the gaming devices in the gaming system. In another such embodiment, upon a determination to trigger a gaming system triggered bonus, the gaming system provides one or more players with a bonus event which is equivalent in value to the bonus accumulation pool. In different embodiments, upon a determination to trigger a gaming system triggered bonus, the gaming system provides one or more players the actual amount contributed to the bonus accumulation pool or a determined theoretical amount based on the bonus accumulation pool. It should be appreciated that any suitable manner of providing the gaming system triggered bonus may be incorporated in the gaming system disclosed herein.

In one embodiment, in addition to funding the bonus accumulation pool with the average expected payout of each skipped bonus game, the gaming system also accumulates one or more triggering symbols or skipped bonus game units for the player (or gaming device) associated with the skipped bonus game. In one such embodiment, for each symbol-driven bonus game triggering event that occurs (which the gaming system determines to skip or otherwise to provide to the player), the gaming system accumulates a quantity of triggering symbols, wherein the quantity of accumulated triggering symbols is based, at least in part, on the symbol-driven bonus game triggering event.

In one embodiment, the gaming system enables the player to utilize such accumulated triggering symbols in one or more gaming system triggered bonus games. In one such embodiment, a player's probability of winning the gaming system triggered bonus game award is based, at least in part, on that player's quantity of accumulated triggering symbols. In this embodiment, the greater a player's quantity of accumulated triggering symbols, the greater that player's probability of winning part or all of the value of the maintained bonus accumulation pool. In another such embodiment, a player's probability of winning a gaming system triggered bonus game award is based, at least in part, on that player's frequency or rate of accumulating triggering symbols over a designated period of time. In this embodiment, the greater the frequency or rate a player accumulates triggering symbols over the designated period of time, the greater that player's probability of winning part or all of the value of the maintained bonus accumulation pool. In another such embodiment, a player's quantity of accumulated triggering symbols determines, at least in part, the amount of a player's gaming system triggered bonus game award. In this embodiment, the greater a player's quantity of accumulated triggering symbols, the greater the portion of the bonus accumulation pool provided to that player.

In one such embodiment wherein a player's probability of winning the gaming system triggered bonus game award is based, at least in part, on that player's quantity of accumulated triggering symbols, the gaming system enables a player to utilize such accumulated triggering symbols in a multi-round gaming system accumulation game. In this embodiment, after each round of game play, if a player has accumulated a designated quantity of triggering symbols, the gaming system enables the player to accept a gaming system triggered bonus award or reject the gaming system triggered bonus award. If the player accepts the offered gaming system triggered bonus award, the gaming system provides a gaming system triggered bonus award to the player wherein the provided gaming system triggered bonus award is based, at least in part, on the current value of the maintained bonus accumulation pool and the number of players that each accumulated the designated quantity of triggering symbols. If the player rejects the offered gaming system triggered bonus award, the gaming system returns the value of the offered gaming system triggered bonus award to the maintained bonus accumulation pool and enables the player to continue attempting to accumulate triggering symbols in a subsequent round to try and win a greater gaming system triggered bonus award. Such a multi-round gaming system accumulation game provides that players that are placing greater wagers and/or placing wagers at a greater frequency have a greater probability of accumulating the designated quantity of triggering symbols in each round and thus have a greater probability of advancing to subsequent rounds to win greater gaming system triggered bonus awards.

In one such embodiment wherein a player's quantity of accumulated triggering symbols determines, at least in part, the amount of a player's gaming system triggered bonus game award, the gaming system enables a player to utilize such accumulated triggering symbols in a gaming enables a player to competitively bid a quantity of that player's accumulated triggering symbols for a gaming system triggered bonus award having a value that is at least a designated amount, but otherwise unknown to the players participating in the bidding sequence. If the player wins the bidding sequence, the player is provided a gaming system triggered bonus award which is based, at least in part, on the quantity of triggering symbols of the winning bid, a random determination of a value of each triggering symbol of the winning bid and the current value of the maintained bonus accumulation pool. Such a gaming system triggered auction sequence provides that players that are placing greater wagers and/or placing wagers at a greater frequency have a greater probability of accumulating triggering symbols to bid in the auction sequence and thus have a greater probability of winning a gaming system triggered bonus award for placing the winning bid.

In one such embodiment wherein a player's probability of winning a gaming system triggered bonus game award is based, at least in part, on that player's frequency or rate of accumulating triggering symbols over a designated period of time, the gaming system enables a player to utilize such accumulated triggering symbols in a gaming system triggered maze game. In this embodiment, for each accumulated triggering symbol, the gaming system enables a player to make one or more moves within a maze. If the player finds or reaches a prize within the maze, the gaming system provides the player a gaming system triggered bonus award which is based, at least in part, on the current value of the maintained bonus accumulation pool. Such a gaming system triggered maze game provides that players that are placing greater wagers and/or placing wagers at a greater frequency have a greater probability of accumulating triggering symbols (i.e., moves in the maze) and thus have a greater probability of finding a prize in the maze to win a gaming system triggered bonus award.

In one embodiment, the gaming system triggered bonus award provided to each player is funded from the bonus accumulation pool and correlates to that player in an equitable manner. In one such embodiment, the gaming system determines each player's portion or share of the bonus accumulation pool based on one or more characteristics or attributes of that player, that player's gaming device or a suitable theme. For example, a first player that the gaming system determined to skip playing a first bonus game with a first average expected bonus payout percentage (and thus a first contribution to the bonus accumulation pool for each skipped gaming device triggered bonus game) is provided a greater gaming system triggered bonus award than a second player that the gaming system determined to skip playing a second bonus game with a second, smaller average expected bonus payout percentage (and thus a second, lower contribution to the bonus accumulation pool for each skipped gaming device triggered bonus game). It should be appreciated that even if a bonus game is skipped, the gaming system triggered bonus is configured such that the total gaming device return (i.e., the base game return plus the gaming system triggered bonus game return) is at least the minimum payback percentage required in certain jurisdictions.

In one embodiment, the central server utilizes a service window opened on one or more gaming devices to display the gaming system triggered bonus. In one such embodiment, the gaming system enables a gaming establishment operator to create one or more aspects of the gaming system triggered bonus, such as the design or graphics, to provide a wide variety of bonus games which are customizable to each gaming establishment. Such a configuration enables for the gaming system triggered bonus games to be quickly changed or swapped out of the gaming devices in the gaming system and thus prolonging the life of the gaming devices which include the features described herein.

Accordingly, the gaming system disclosed herein thus provides for the accumulation of a plurality of bonus game triggering events and the contribution of the average expected payouts of these accumulated events to a pool or fund which is subsequently provided to one or more players at one or more of the gaming devices in the gaming system via a gaming system triggered bonus. Such a configuration provides that the gaming system triggered bonus game contributes an increased percentage to the total return to players (compared to known gaming system triggered bonus games) and complies with jurisdictional minimums for total returns. Such a configuration further provides that one or more gaming system triggered bonuses can be associated with gaming devices without having to change or otherwise modify the paytables associated with such gaming devices. The gaming system disclosed herein also provides for a gaming system triggered bonus which is configured to be delivered to many types of gaming devices without having special game software associated with each gaming device. The gaming system disclosed herein further provides for gaming establishments to offer unique gaming system bonus games to their players that are branded to the gaming establishment and thus build player loyalty to the gaming establishment.

Additional features and advantages of the disclosed embodiments are described in, and will be apparent from, the following Detailed Description of the Invention and the Figures.

BRIEF DESCRIPTION OF THE FIGURES

FIG. 10 is a chart of one example embodiment of the gaming system disclosed herein illustrating the results of a plurality of players attempting to each accumulate at least a target quantity of triggering symbols.

FIG. 11 is a chart of one example embodiment of the gaming system disclosed herein illustrating the determination of an accumulation game award based on a portion of the maintained bonus accumulation pool and the number of players that accumulate at least a target quantity of triggering symbols.

DETAILED DESCRIPTION

The present disclosure may be implemented in various configurations for gaming machines, gaming devices, or gaming systems, including but not limited to: (1) a dedicated gaming machine, gaming device, or gaming systems wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are computerized instructions for controlling any primary games are communicated from the central server to the gaming device in a thick client configuration and computerized instructions for controlling any secondary games or bonus functions are executed by a central server in a thin client configuration.

Figure 1A:
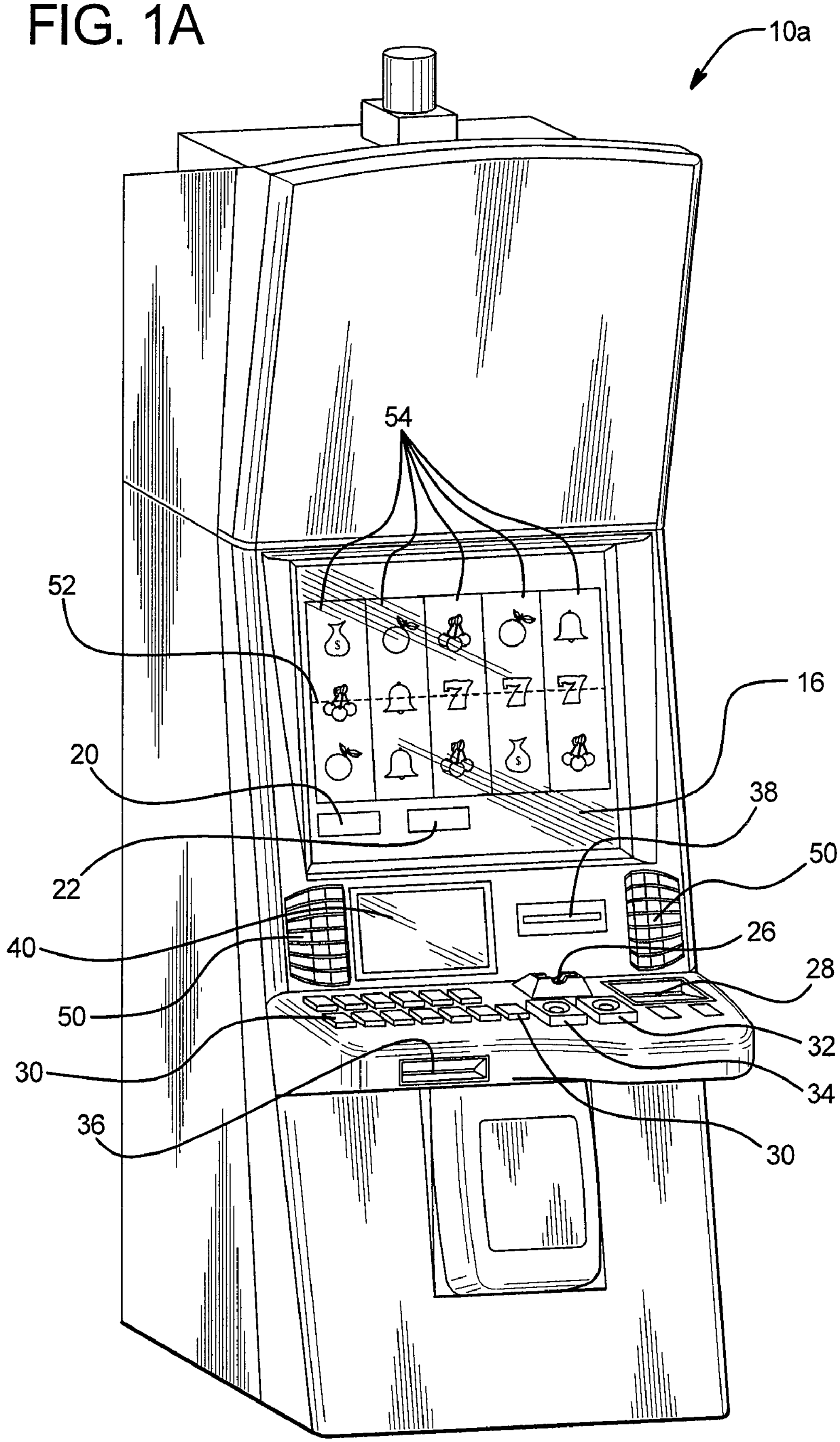
FIG. 1A is a front-side perspective view of one embodiment of the gaming device disclosed herein.
Figure 1B:
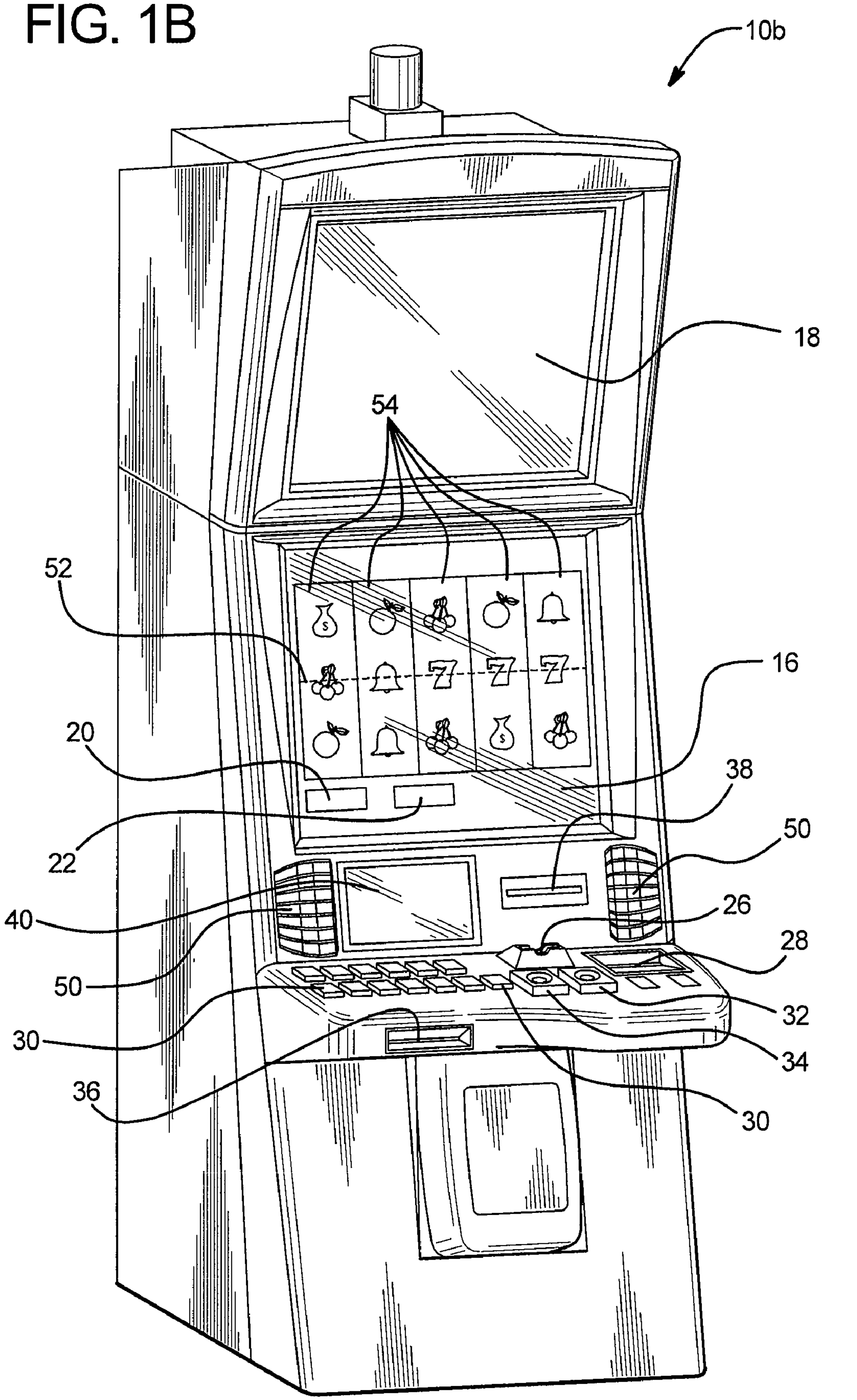
FIG. 1B is a front-side perspective view of another embodiment of the gaming device disclosed herein.

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
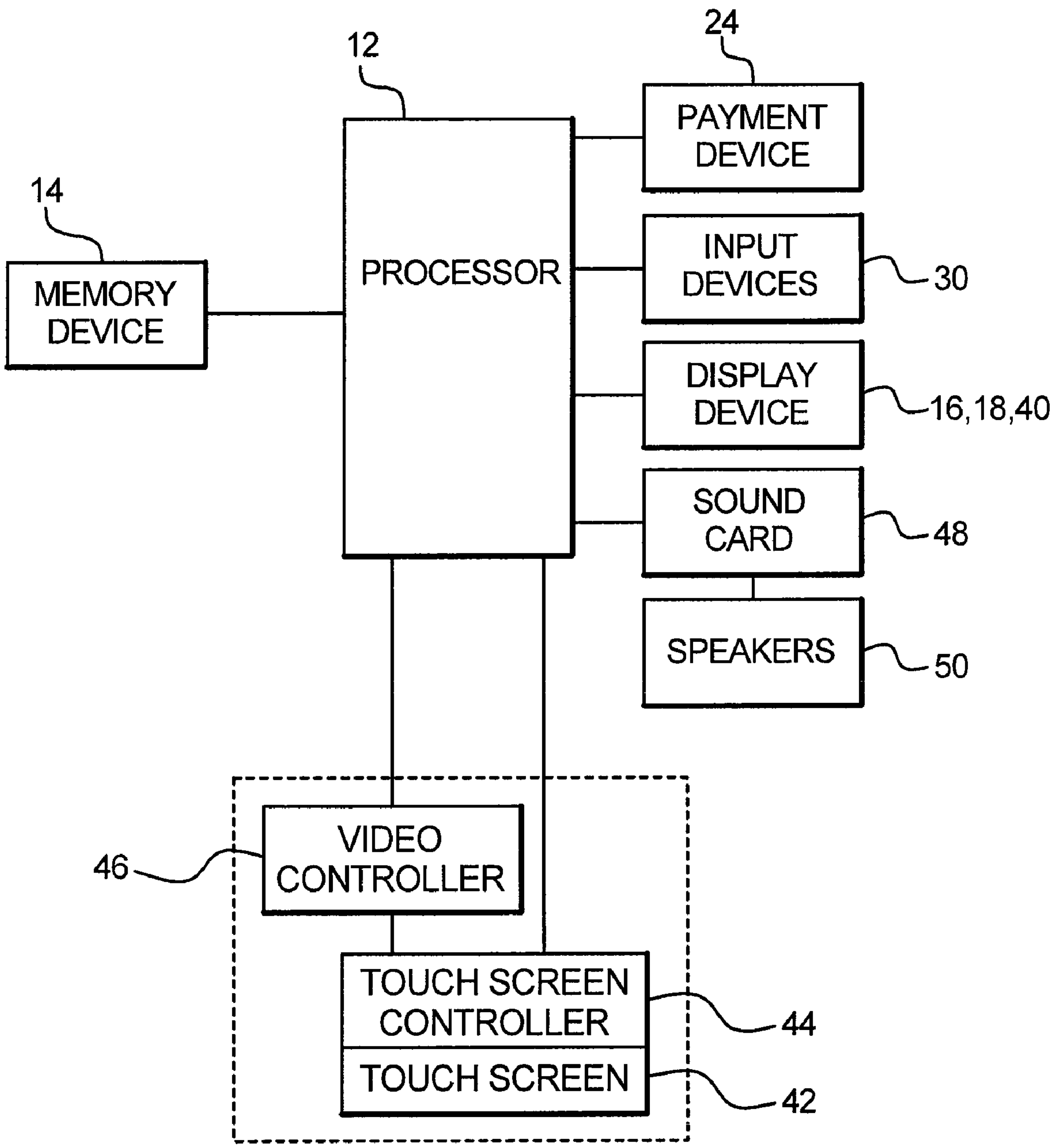
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data), and other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game and as described below, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, as described below, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In one embodiment, the gaming device includes a program which will automatically begin a bonus round after the player has achieved a triggering event or qualifying condition in the base or primary game (if the central server determines to provide the triggered bonus round). In another embodiment, after a player has qualified for a bonus game (and the central server determines to provide the triggered bonus game), the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
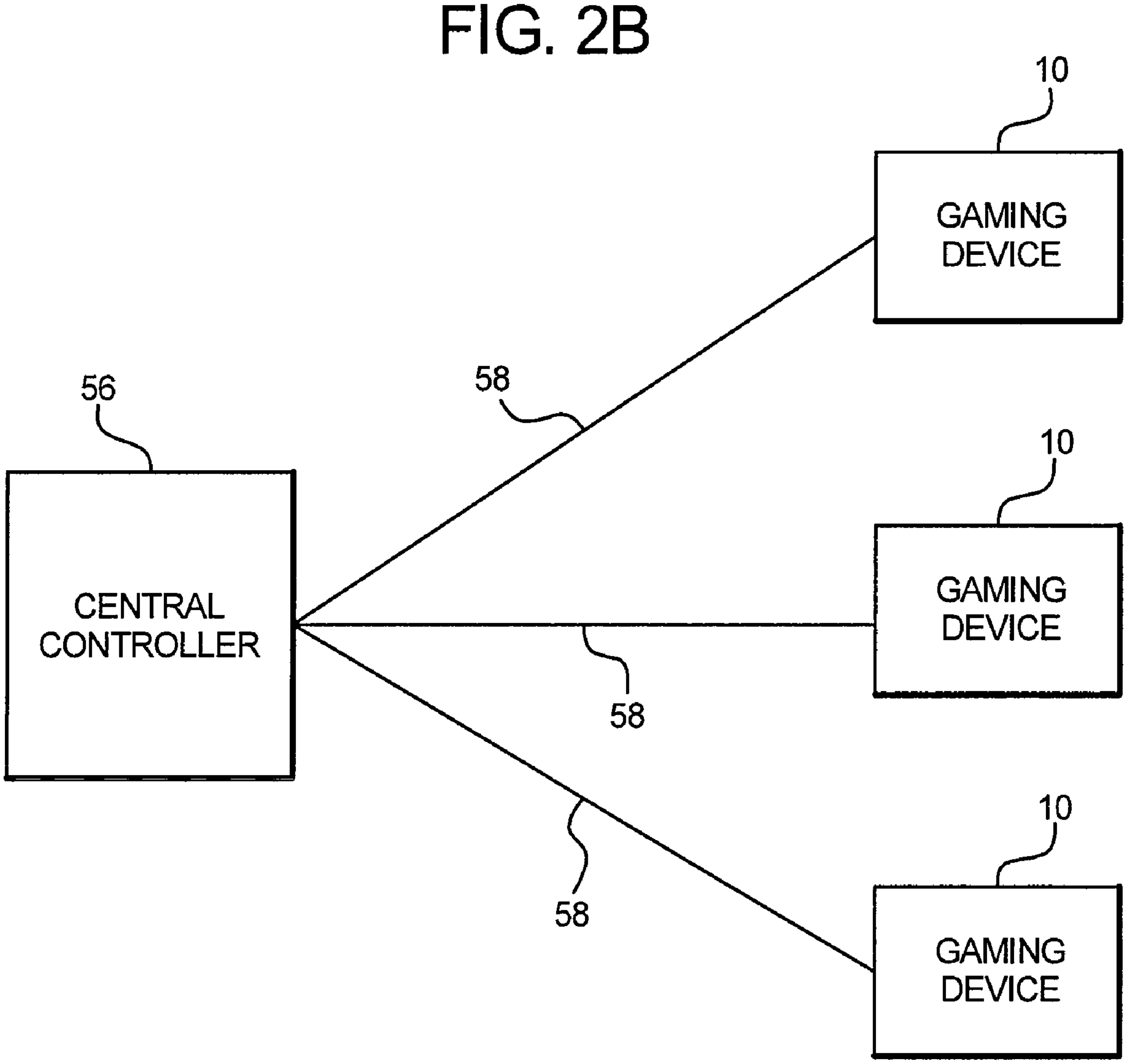
FIG. 2B is a schematic block diagram illustrating a plurality of gaming devices in communication with a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno, or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a p redetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In on such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Configurable Bonus Game Triggering Outcomes

Figure 3:
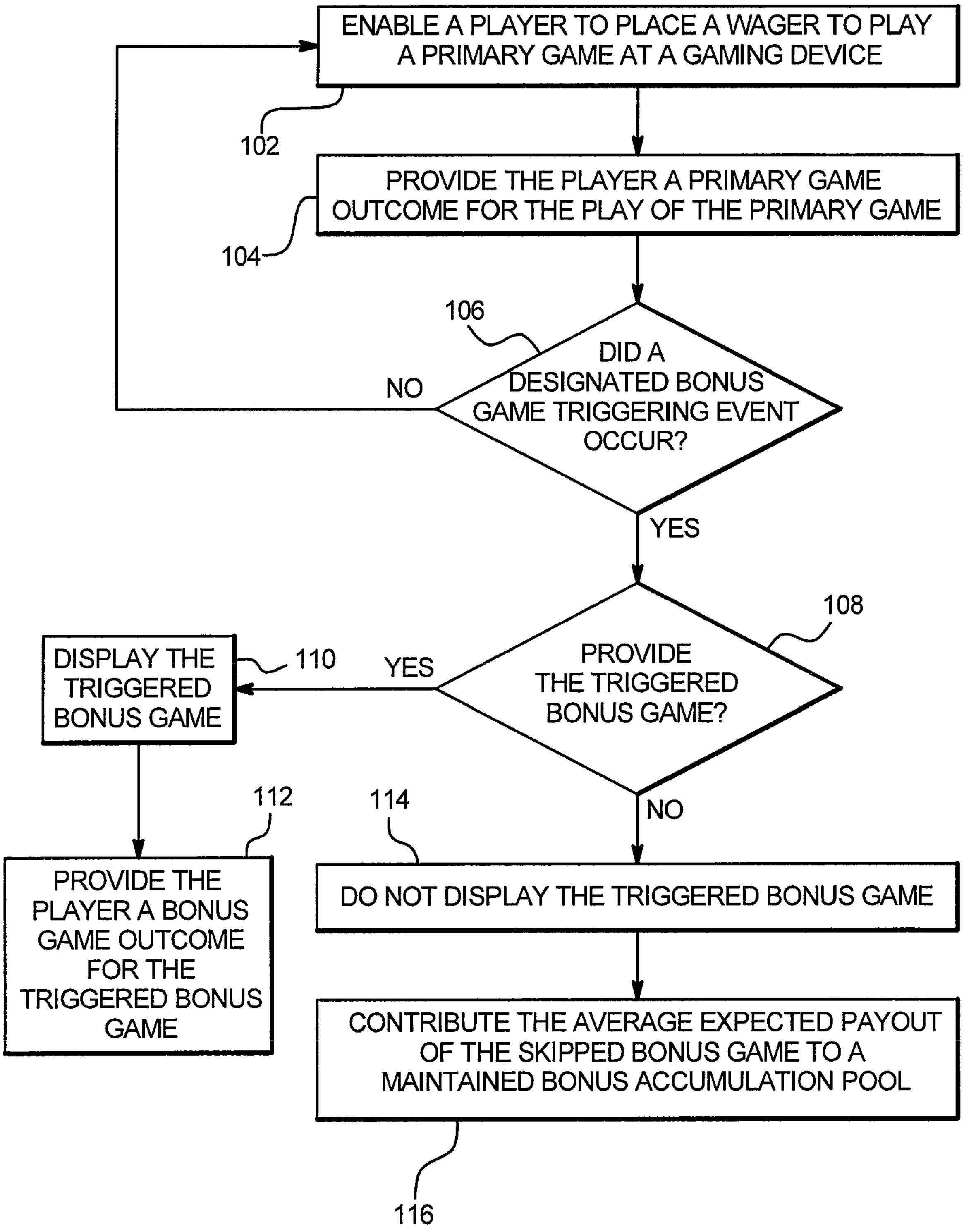
FIG. 3 is a flowchart of one embodiment of the gaming system herein disclosed illustrating a determination to provide a gaming device triggered bonus or to contribute an amount to a bonus accumulation pool.

Referring now to FIG. 3, in one embodiment, the gaming system and method disclosed herein enables a player to place a wager to play a primary or base game at the gaming device as indicated in block 102 of FIG. 3. In this embodiment, the gaming device provides the player a primary game outcome (and any primary game award) for the play of the primary game as indicated in block 104. It should be appreciated that any suitable primary or base game disclosed herein or otherwise known may be implemented in accordance with the gaming system disclosed herein.

In one embodiment, the gaming system determines if a designated or flagged bonus game triggering event occurred as indicated in diamond 106. In one embodiment, the bonus game triggering event occurs in association with the displayed primary or base game. That is, the gaming system designates or flags one or more displayed events or outcomes, such as a designated triggering symbol or triggering symbol combination, which occur in association with the displayed primary game (i.e., a symbol-driven event) and cause the gaming device to trigger a bonus game. In another embodiment, the bonus game triggering event occurs independent of any displayed event in the play of the primary game. That is, the gaming system designates or flags one or more events which are not displayed in any play of any game (i.e., a mystery event) and cause the gaming device to trigger a bonus game. In another embodiment, a designated bonus game triggering event occurs at least partially based on a game triggered or symbol triggered event, such as at least partially based on the play of a primary game. It should be appreciated that providing a primary game outcome and determining if a designated bonus game triggering event occurred may be done in any suitable order.

In one embodiment, if the flagged bonus game triggering event does not occur, the gaming device enables the player to place another wager for another play of the primary game as described above. In this embodiment, if the flagged bonus game triggering event occurred, a determination occurs whether to provide the triggered bonus game as indicated in diamond 108 of FIG. 3. In one such embodiment, the gaming device determines whether or not to provide the triggered bonus game. In another such embodiment, the central server determines whether or not to provide the triggered bonus game.

In one embodiment, the determination of whether or not to provide the triggered bonus game is based on a random determination. In this embodiment, the gaming device and/or central server randomly determines whether to provide the triggered bonus game or skip the triggered bonus game. In another embodiment, the determination of whether or not to provide the triggered bonus game is randomly determined based on one or more weighted percentages. In this embodiment, skipping the triggered bonus game is associated with a first probability or percentage and providing the triggered bonus game is associated with a second probability or percentage, wherein the gaming device and/or central server randomly determines to provide or skip the triggered bonus game based on these probabilities. In another embodiment, the determination of whether or not to provide the triggered bonus game is based on one or more set intervals, such as every third triggered bonus game is skipped. In different embodiments, the determination of whether or not to provide the triggered bonus game is predetermined, determined based on a player's status (such as determined through a player tracking system), determined based on a generated symbol or symbol combination, determined based on one or more side wagers placed, determined based on the player's primary game wager, determined based on time (such as the time of day), determined based on an amount of coin-in accumulated in one or more pools, or determined based on any other suitable method or criteria.

In another embodiment, the gaming system is configured to either provide the gaming device triggered bonus game for all occurrences of the bonus game triggering event or skip the gaming device triggered bonus game for all occurrences of the bonus game triggering event. That is, in this embodiment, rather than determining, for each occurrence of the bonus game triggering event, whether to provide the triggered bonus game or skip the triggered bonus game, the central server instructs the gaming devices to either provide the triggered bonus game for all occurrences of the bonus game triggering event or skip the triggered bonus game for all occurrences of the bonus game triggering event. In this embodiment, if the triggered bonus game is skipped, the gaming device communicates the average expected payout of the skipped bonus game to be contributed to a bonus accumulation pool as described herein. Accordingly, such an embodiment provides that the bonus game for one or more gaming devices is configured to be enabled or disabled (i.e., turned on or turned off) from the central server.

In one embodiment, if the determination is to provide the triggered bonus game, the gaming device displays to the player the triggered bonus game and provides the player a bonus game outcome (and any bonus game award) as indicated in blocks 110 and 112 of FIG. 3.

In one embodiment, if the determination is to skip or otherwise not provide the gaming device triggered bonus game, the gaming system does not display the triggered bonus game and contributes the average expected payout of the skipped bonus game to a maintained bonus accumulation pool as indicated in blocks 114 and 116. That is, the gaming device communicates data or information to the central server regarding the skipped bonus game and one or more characteristics or attributes of the skipped bonus game. In different embodiments, such communicated data or information includes, but is not limited to, the theoretical average expected payout of the skipped bonus game, the type of bonus game skipped, the identification of the player not provided the bonus game, the identification of the gaming device which skipped the bonus game.

In one embodiment, if the determination is to skip or otherwise not provide the gaming device triggered bonus game, the gaming device provides the player any non-bonus award associated with the bonus game triggering event. For example, if the bonus game is triggered by a designated symbol or symbol combination, the gaming device does not trigger a bonus game, but provides the player an award associated with the designated symbol or symbol combination. It should be appreciated that in this embodiment, the gaming device does not display any bonus game to the player and does not provide the player any bonus game award.

Figure 4:
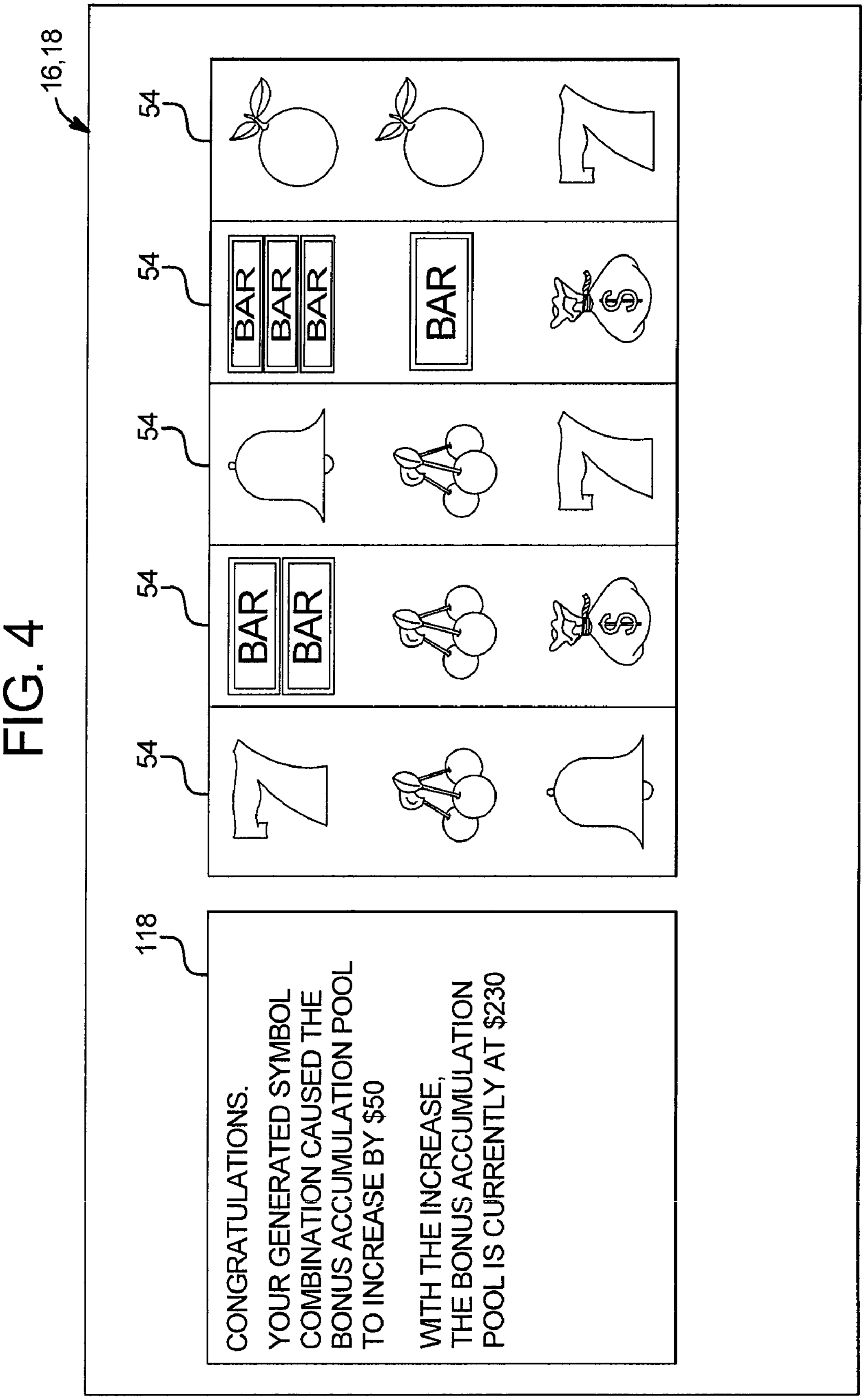
FIG. 4 is a front view of one example of a game play screen of a gaming device disclosed herein illustrating a contribution of an amount to a bonus accumulation pool.

In one embodiment, if the gaming system determines to skip or otherwise not provide the gaming device triggered bonus game, the gaming system displays to the player an increase of the bonus accumulation pool. For example, as seen in FIG. 4, if the gaming device currently played by Player A generated a symbol combination that is associated with a triggering of a bonus game, but the gaming system determined not to provide the triggered bonus game to the player, the gaming device displays to the player that their generated symbol combination causes the bonus accumulation pool to increase $50 based on the skipped bonus game. In one embodiment, as seen in FIG. 4, the central server utilizes a service window 118 opened on the gaming device to display any suitable information regarding the skipping of a triggered bonus game, the current amount in the bonus accumulation pool and/or the providing of a gaming system triggered bonus. In one such example embodiment, the gaming device displays appropriate messages such as "CONGRATULATIONS. YOUR GENERATED SYMBOL COMBINATION CAUSED THE BONUS ACCUMULATION POOL TO INCREASE BY $50" and "WITH THE INCREASE, THE BONUS ACCUMULATION POOL IS CURRENTLY AT $230" to the player visually, or through suitable audio or audiovisual displays.

In different embodiments, the information displayed to the player includes, but is not limited to, a player's accumulated equity in the bonus accumulation pool, a player's relative contributions to the bonus accumulation pool, a total value of the bonus accumulation pool. In another embodiment, rather than displaying to the player their contribution to the bonus accumulation pool and the current value of the bonus accumulation in terms of credits or dollars, the gaming system displays to the player their contribution to the bonus accumulation pool and the current value of the bonus accumulation pool in terms of bonus accumulation pool units. In one such embodiment, the player is unaware of the actual value associated with each bonus accumulation pool unit until a gaming system triggering event occurs.

In another embodiment, if the gaming device generated an outcome that is associated with a triggering of a bonus game, but the gaming system determined not to provide the triggered bonus game to the player, the gaming device displays one or more alternate symbols which are different than the symbols the gaming device displays if the gaming device generated the same outcome and provided the triggered bonus game. In this embodiment, the gaming device generates the same outcome but displays a different presentation to the player.

In another embodiment, at least one symbol is a dual symbol, wherein if the gaming device generated an outcome that is associated with a triggering of a bonus game, but the gaming system determined not to provide the triggered bonus game to the player, the dual symbol displays to the player a second determination related to whether to skip or provide the triggered bonus game. For example, if three generated cherry symbols are associated with a triggering of a bonus game, the gaming device displays one of the cherry symbols (i.e., a dual symbol) spinning wherein the result of this spin displays whether the player will proceed to the bonus game or whether the bonus game will be skipped. It should be appreciated that any suitable manner of conveying to the player that the bonus game will be skipped may be implemented in accordance with the gaming system disclosed herein.

In another embodiment, if a designated symbol or symbol combination that is associated with a triggering of a bonus game is generated, the gaming system displays a first paytable if the triggered bonus game is provided to the player and displays a second, different paytable if the triggered bonus game is not provided to the player. For example, the first paytable (which is associated with providing the triggered bonus game) informs the player that a designated symbol combination is associated with a first award amount and causes a triggering of a bonus game. In this example, the second paytable (which is associated with skipping the triggered bonus game) informs the player that the same designated symbol combination is associated with a second, different award amount. In one such embodiment, which paytable the gaming device displays depends on the current configuration of the gaming system. In another embodiment, if a designated symbol or symbol combination that is associated with a triggering of a bonus game is generated, the gaming system displays one paytable to the player wherein the paytable informs the player that the designated symbol or symbol combination that is associated with a triggering of the bonus game may or may not provide the player a play of a bonus game if such a designated symbol or symbol combination is generated.

Figure 5:
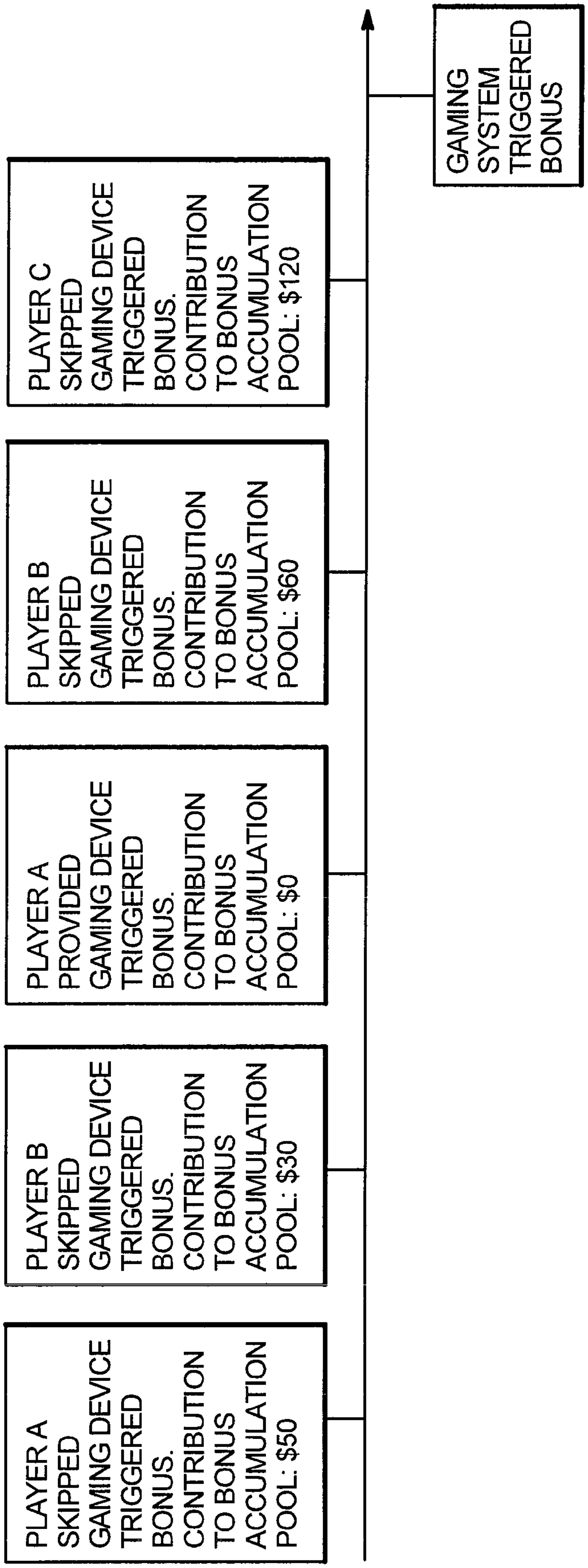
FIG. 5 is a timeline illustrating a plurality of skipped gaming device triggered bonuses and a plurality of contribution to a bonus accumulation pool.

It should be appreciated that the gaming system disclosed herein operates as described above for a plurality of gaming devices such that at different points in time, the gaming system determines for a plurality of players whether to display and provide a gaming device triggered bonus game or skip the triggered bonus game and contribute the theoretical bonus payout of the skipped bonus game to a bonus accumulation pool. For example, as seen in FIG. 5, at a first point in time, the gaming system determines to skip a gaming device triggered bonus for Player A (and thus contribute the $50 average expected payout of this skipped bonus to a bonus accumulation pool), but at a second point in time, the gaming system determines to provide a gaming device triggered bonus for Player A (and thus contribute $0 to the bonus accumulation pool). As also seen in FIG. 5, at another point in time, the B (and thus contribute the $30 average expected payout of this skipped bonus to a bonus accumulation pool).

Figure 6:
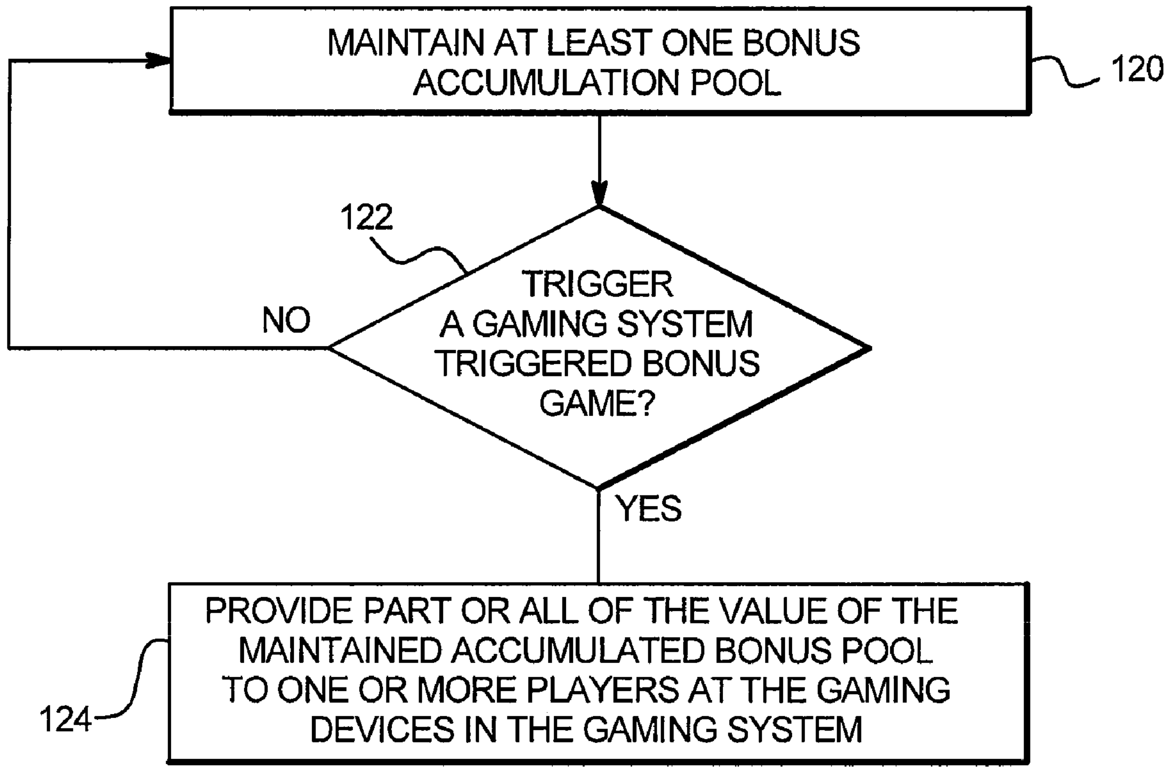
FIG. 6 is a flowchart of one embodiment of the gaming system herein disclosed illustrating a determination to provide a gaming system triggered bonus.

In one embodiment, the central server maintains at least one bonus accumulation pool as indicated in block 120 of FIG. 6. In this embodiment, a theoretical value (i.e., the theoretical average expected payout) associated with each skipped bonus game funds the bonus accumulation pool. In another embodiment, the central server maintains a plurality of bonus accumulation pools.

In different embodiments, each maintained bonus accumulation pool is associated with one or more of any suitable characteristics pertaining to the skipped bonus game, the gaming device which triggered the skipped bonus game, the player that is not provided the skipped bonus game, the gaming establishment or any other suitable aspect of the player's gaming experience. In one such embodiment, the central server maintains a plurality of bonus accumulation pools for a plurality of different types of skipped bonus games. In this embodiment, if a bonus game is triggered but not provided to a player, the theoretical value associated with that skipped bonus game funds the bonus accumulation pool associated with that type of skipped bonus game. In another such embodiment, the central server maintains a plurality of bonus accumulation pools for a plurality of different player rankings (as determined through a player tracking system). In this embodiment, if a bonus game is triggered but not provided to a player, the theoretical value associated with that skipped bonus game funds the bonus accumulation pool associated with the player tracking status of the player not provided the skipped bonus game.

In another embodiment, the bonus accumulation pool is further funded, at least in part, based on one or more player's wagers at the gaming devices in the gaming system. In another embodiment, the bonus accumulation pool is further funded, at least in part, via a side-bet or side-wager which the player may make (and which may be tracked via a side-bet meter). In another embodiment, the bonus accumulation pool is further funded, at least in part, via an amount provided by one or more marketing and/or advertising departments, such as a casino's marketing department.

In one embodiment, the central server determines whether to trigger a gaming system triggered bonus game as indicated in diamond 122 of FIG. 6. In one embodiment, the central server determines whether to trigger a gaming system triggered bonus game at set intervals, such as at designated periods of time, when an amount of coin-in at the gaming devices reach a threshold or when the bonus accumulation pool reaches a threshold. In one such embodiment, the central server determines to trigger the gaming system triggered bonus based on a displayed event in a play of one or more displayed games of one or more of the gaming devices in the gaming system. In another embodiment, the central server determines to trigger the gaming system triggered bonus independent of any displayed event in any play of any game of any of the gaming devices in the gaming system.

In one embodiment, if the central server determines not to trigger a gaming system bonus, the central server continues maintaining at least one bonus accumulation pool as described above. On the other hand, if the central server determines to trigger a gaming system bonus, the central server provides part or all of the value of the maintained bonus accumulation pool to one or more players at the gaming devices in the gaming system as indicated in block 124 of FIG. 6. That is, the central server utilizes a gaming system triggered bonus to redistribute the theoretical average expected payouts contributed from the skipped gaming device triggered bonus games. It should be appreciated that even if a bonus game is skipped, the gaming system triggered bonus is configured such that the total gaming device return (i.e., the base game return plus the gaming system triggered bonus game return) is at least the minimum payback percentage required in certain jurisdictions. Such a configuration provides that the gaming system disclosed herein is operable to provide that a gaming system bonus contributes an increased percentage to the total return to players (compared to known gaming system triggered bonus games) and complies with jurisdictional minimums for total returns.

In one embodiment, upon a determination to trigger a gaming system triggered bonus, the gaming system provides the bonus accumulation pool as a gaming system bonus award to one of the players at one of the gaming devices in the gaming system. In one such embodiment, each player's probability of winning the gaming system bonus award is based on that player's relative contribution to the bonus accumulation pool. For example, if Player A's skipped bonus game(s) caused a contribution of $50 to the bonus accumulation pool, Player B's skipped bonus game(s) caused a contribution of $90 to the bonus accumulation pool and Player C's skipped bonus game(s) caused a contribution of $120 to the bonus accumulation pool (for a total bonus accumulation pool of $260, then Player A's probability of winning the gaming system award is 19% (or 50/260), Player B's probability of winning the gaming system award is 35% (or 90/260) and Player C's probability of winning the gaming system award is 46% (or 120/260).

In different embodiments, in addition to or alternatively based on each player's relative contribution to the bonus accumulation pool, each player's probability of winning the gaming system bonus award is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

Figure 7:
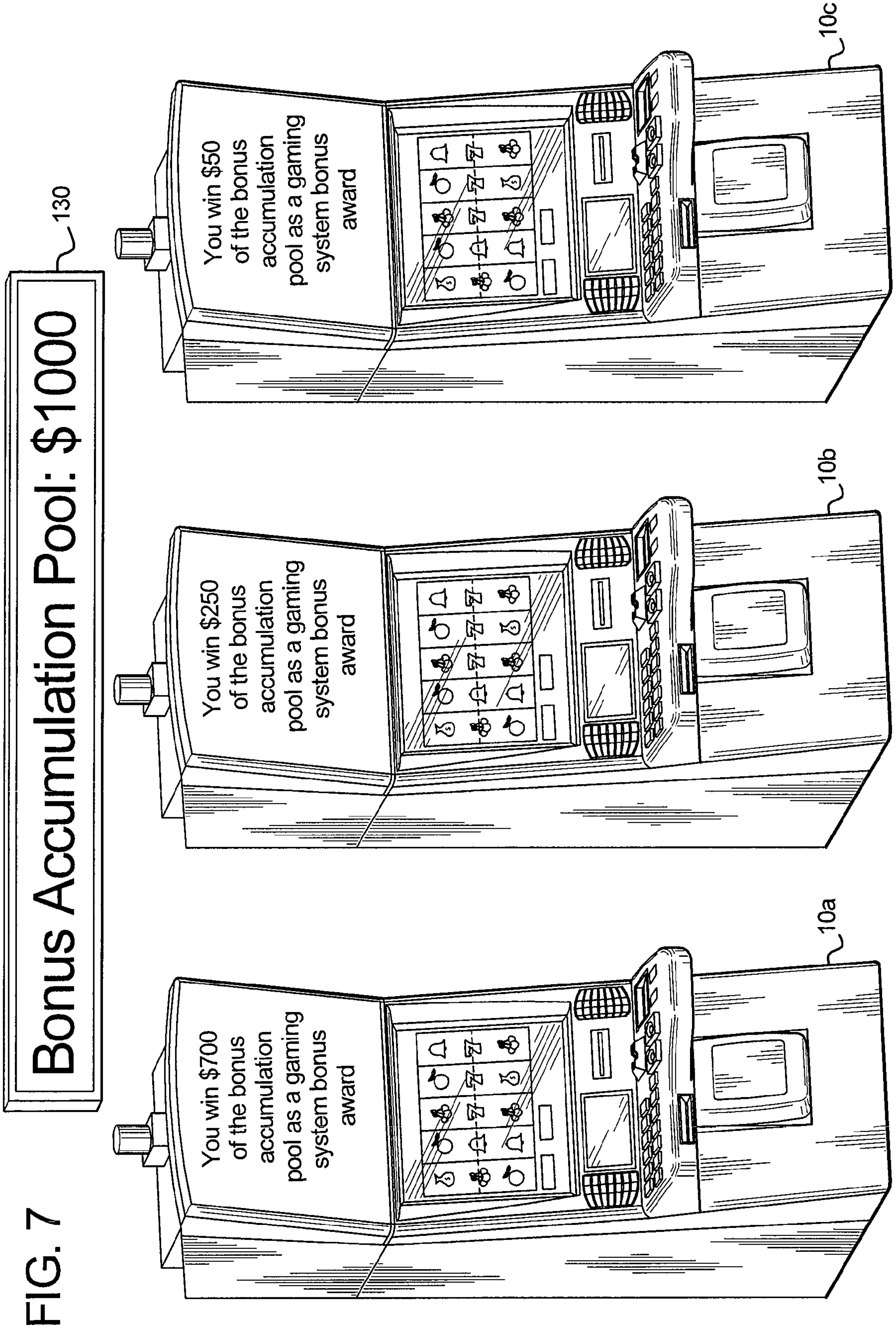
FIG. 7 is a schematic diagram of one embodiment of the gaming system disclosed herein illustrating a plurality of gaming devices each providing a portion of a bonus accumulation pool upon a determination to provide a gaming system triggered bonus.

In another embodiment, upon a determination to trigger a gaming system triggered bonus, the gaming system provides each of a plurality of the players at a plurality of the gaming devices with a portion of the bonus accumulation pool as gaming system bonus awards. In this embodiment, the central server utilizes a gaming system triggered group bonus which is simultaneously provided to a plurality of players at the gaming devices in the gaming system. For example, as seen in FIG. 7, upon a determination to trigger a gaming system bonus, if the bonus accumulation pool is currently at $1000 (as seen on gaming system display device 130), the central server causes (i) a first gaming device 10*a* to provide a first portion of the bonus accumulation pool (in this case $700) as a gaming system bonus award, (ii) a second gaming device 10*b* to provide a second portion of the bonus accumulation pool (in this case $250) as a gaming system bonus award, and (iii) a third gaming device 10*c* to provide a third portion of the bonus accumulation pool (in this case $50) as a gaming system bonus award. In another such embodiment, upon a determination to trigger a gaming system triggered bonus, the gaming system provides one or more players with a bonus event which is equivalent in value to the bonus accumulation pool.

In one embodiment, the gaming system triggered bonus award provided from the bonus accumulation pool to each player correlates to that player in an equitable manner. In one such embodiment, each player's portion of the gaming system triggered bonus award is based on that player's relative contribution to the bonus accumulation pool. For example, if Player A's skipped bonus game(s) caused a contribution of $50 to the bonus accumulation pool, Player B's skipped bonus game(s) caused a contribution of $90 to the bonus accumulation pool and Player C's skipped bonus game(s) caused a contribution of $120 to the bonus accumulation pool (for a total bonus accumulation pool of $260), then Player A's portion of the gaming system award is $50, Player B's portion of the gaming system award is $90 and Player C's portion of the gaming system award is $120.

In another such embodiment, if one or more players are not actively playing a gaming device in the gaming system when a gaming system bonus is triggered, such players are not provided any gaming system triggered bonus award. In this embodiment, these player's contributions to the bonus accumulation pool are forfeited by such players and redistributed amongst the remaining players that are provided gaming system bonus awards. In one such embodiment, each player's provided portion of the gaming system triggered bonus award is based on that player's contribution to the bonus accumulation pool relative to the total contribution to the bonus accumulation pool of each other player that is provided a portion of the gaming system bonus award. For example, if Player A's skipped bonus game(s) caused a contribution of $50 to the bonus accumulation pool, Player B's skipped bonus game(s) caused a contribution of $90 to the bonus accumulation pool, Player C's skipped bonus game(s) caused a contribution of $120 to the bonus accumulation pool and other inactive players (i.e., players that are not actively playing any gaming device) skipped bonus game(s) caused a contribution of $240 (for a total bonus accumulation pool of $500), then Player A's portion of the gaming system award is $96 (or (50/260)×500), Player B's portion of the gaming system award is $173 (or (90/260)×500) and Player C's portion of the gaming system award is $231 (or 120/260)×500).

In another embodiment, the gaming system determines each player's portion or share of the bonus accumulation pool based on one or more characteristics or attributes of that player, that player's gaming device or any suitable theme. In different embodiments, in addition to or alternatively based on each player's relative contribution to the bonus accumulation pool, each player's portion of the gaming system bonus award is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In another embodiment, if a gaming system triggering event occurs, the gaming system provides a theoretical amount of the bonus accumulation pool to one or more players. In this embodiment, rather than providing the actual amount contributed to the bonus accumulation pool (as described herein), the gaming system determines a theoretical amount based on the bonus accumulation pool and provides such determined amounts to the players. It should be appreciated that such provided theoretical amounts provided to each player may be greater than, less than or equal to the actual amount contributed to the bonus accumulation pool for that player's skipped bonus games. It should be further appreciated that since the amounts provided to the players as gaming system bonus awards are based on a theoretical value, the total gaming system bonus awards provided to such players may be less than, greater than or equal to the actual amount contributed to the bonus accumulation pool. For example, if Player A's skipped bonus game(s) caused a contribution of $50 to the bonus accumulation pool, Player B's skipped bonus game(s) caused a contribution of $150 to the bonus accumulation pool, Player C's skipped bonus game(s) caused a contribution of $200 to the bonus accumulation pool, the gaming system determines to provide Player A a gaming system award of $40, Player B a gaming system award of $230, and Player C a gaming system award of $205.

In another embodiment, the gaming system provides for a plurality of individual triggering events of the gaming system bonus. In one such embodiment, when an individual triggering event occurs for the gaming system bonus, the gaming system provides a portion of the bonus accumulation pool to a player associated with the individual trigger. For example, if an individual triggering event occurs in association with a first gaming device at a first point in time, the player of that first gaming device is provided a portion of the bonus accumulation pool. In this example, if another individual triggering event occurs in association with a second gaming device at a second, subsequent point in time, the player of that second gaming device is provided another portion of the bonus accumulation pool. Accordingly, this embodiment provides that the bonus accumulation pool is provided to players over a period of time and based on a plurality of triggering events. It should be appreciated that such individual gaming system bonus triggering events may occur in any suitable manner, such as based on a consecutive quantity of winning outcomes for a player, based on a consecutive quantity of losing outcomes for a player, based on an amount of coin-in or coin-out wagered by one or more players, or based on any event disclosed herein.

It should be appreciated that any suitable manner of providing the gaming system bonus to the player may be incorporated in the gaming system disclosed herein. That is, any suitable primary game or secondary game may be utilized as the gaming system triggered bonus to provide one or more of the players of the gaming devices of the gaming system with a gaming system bonus award. In different embodiments, the gaming system triggered bonus may incorporate any of the types of games described herein, as well as any suitable puzzle-type game, any suitable persistence game, any suitable wheel game, any suitable selection game, any suitable offer and acceptance game, any suitable cascading symbols game, any suitable ways to win game, any suitable scatter pay game, any suitable group game or any other suitable type of game.

In another embodiment, if a determination occurs to skip the gaming device triggered bonus, a portion of the average expected payout of the skipped bonus game is provided to the player. In different embodiments, the portion of the average expected payout of the skipped bonus game provided to the player is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria. In different embodiments, the portion of the average expected payout of the skipped bonus game that is contributed to the bonus accumulation pool is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In another embodiment, the gaming system enables a player to skip a triggered bonus game or play the triggered bonus game. In this embodiment, if the player elects to skip the triggered bonus game, the average expected payout of the skipped bonus game is contributed to the bonus accumulation pool and the gaming system proceeds as described above. In one embodiment, the gaming system enables a player to skip a triggered bonus game via a service window on the player's gaming device. In another embodiment, the gaming system enables a player to input one or more preferences (such as through the player tracking system), wherein if a bonus game is triggered, the gaming system determines, based on the player's inputted preferences, to provide the triggered bonus game or skip the triggered bonus game.

In another embodiment, since different gaming devices in the gaming system have different paytables with different bonus game payout percentages accounting for different percentages of the total gaming device return, the gaming system provides that the gaming system triggered bonus accounts for a designated payout percentage for all gaming devices in the gaming system. In this embodiment, if the paytable of an individual gaming device has a greater bonus game payout percentage than the gaming system designated payout percentage, the gaming system provides the player of that individual gaming device with an additional award, such as credits or promotional credits. In different embodiments, this additional award is provided when the bonus game triggering event occurs or when the gaming device triggers a bonus game, such as when a flagged designated symbol combination is generated. For example, if the paytable of a first gaming device accounts for 25% of the total gaming device return to be provided via a bonus game and the paytable of a second gaming device accounts for 35% of the total gaming device return to be provided via a bonus game, the gaming system determines a gaming system bonus payout percentage of 25%. In this example, if a gaming system bonus triggering event occurs and the central server determines to provides each of the player at the first gaming device and the player at the second gaming device with 100 credits, to compensate for the second gaming device having a higher bonus game payout percentage, the gaming system provides the player at the second gaming device with an additional award of 25 credits or promotional credits.

In another embodiment, the central server modifies the theoretical payouts provided by the bonus accumulation pool based on any suitable criteria, such as the time of day, a day of the week or the occupancy of the gaming establishment. For example, if there is $10,000 in the bonus accumulation pool and the gaming establishment operator wants to increase the gaming system triggered bonus awards provided by 5% (and thus redistribute 105% of the bonus accumulation pool), the central server increases the value of the bonus accumulation pool to $10,500. In one such embodiment, this additional 5% added to the bonus accumulation pool is funded, at least in part, via an amount provided by one or more marketing and/or advertising departments, such as a casino's marketing department. In one such embodiment, the central server utilizes a reverse pool to fund the additional 5% added to the bonus accumulation pool. In this embodiment, the central server fills or funds a reverse pool after one or more gaming system triggered bonuses actually occur. In one such embodiment, the central server builds and depletes the reverse pool between gaming system triggered bonuses. For example, if the central server redistributed $10,500 of a bonus accumulation pool when the bonus accumulation pool included $10,000, the central server must wait until the reverse pool fills up for the gaming system triggered bonus previously provided (in this example $500) before accumulating and triggering another gaming system bonus.

In one embodiment, as mentioned above, one or more bonus game triggering events are based on an outcome associated with one or more plays of any primary game of that gaming device. In one such embodiment, the gaming device's determination to trigger a bonus game and the subsequent determination to display the triggered bonus game is symbol driven based on the generation of one or more designated symbols or symbol combinations. That is, when a designated symbol or symbol combination is randomly generated, a determination occurs whether or not the bonus game associated with this symbol-driven event is triggered.

In another embodiment, one or more bonus game triggering events occur in an apparently random fashion as perceived by the player at that gaming device. In one embodiment, the gaming device does not provide any apparent reasons to the player. In this embodiment, the bonus game is not triggered by an event in the primary game or based specifically on any of the plays of the primary game of that gaming device. That is, such a bonus game is triggered without any explanation or alternatively with simple explanations.

In another embodiment, a gaming device tracks the occurrences of one or more suitable events occurring at or in association with one or more players and/or the gaming device and determines, based on these tracked events, whether to trigger a bonus game. In another embodiment, the gaming device defines one or more game play parameters, wherein each time a player's tracked game play activity satisfies the defined parameter, the gaming device triggers a bonus game.

In another embodiment, a gaming device triggered bonus occurs based on an amount of coin-in. In this embodiment, the gaming device determines if an amount of coin-in wagered at that gaming device reaches or exceeds a designated amount of coin-in (i.e., a gaming device triggered bonus threshold coin-in amount). Upon the amount of coin-in wagered at the gaming device reaching or exceeding the gaming device triggered bonus threshold coin-in amount, the gaming device triggers a bonus game and a determination occurs whether to display the triggered bonus game. In different embodiments, the gaming device triggered bonus threshold coin-in amount is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day) or determined based on any other suitable method or criteria.

In another embodiment, a gaming device triggered bonus occurs based on an amount of coin-out. In this embodiment, the gaming device determines if an amount of coin-out provided at that gaming device reaches or exceeds a designated amount of coin-in (i.e., a gaming device triggered bonus threshold coin-out amount). Upon the amount of coin-out provided at the gaming device reaching or exceeding the gaming device triggered bonus threshold coin-out amount, the gaming device triggers a bonus game and a determination occurs whether to display the triggered bonus game. In different embodiments, the gaming device triggered bonus threshold coin-out amount is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day) or determined based on any other suitable method or criteria.

In an alternative embodiment, a gaming device triggered bonus occurs based on a predefined variable reaching a defined parameter threshold. For example, when the $500^{th}$ player has played the gaming device (ascertained from a player tracking system), the gaming device triggers a bonus game and a determination occurs whether to display the triggered bonus game. In different embodiments, the predefined parameter thresholds include a length of time, a length of time after a certain dollar amount is hit, a wager level threshold for a specific machine (which gaming device is the first to contribute $250,000), or any other parameter that defines a suitable threshold.

In another embodiment, a gaming device triggered bonus occurs based on time. In this embodiment, a time is set for when a gaming device triggers a bonus game and a determination occurs whether to display the triggered bonus game. In one embodiment, such a set time is based on historic data.

In another embodiment, a gaming device triggered bonus occurs based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the central controller/gaming device processor recognizes the player's identification (via the player tracking system) when the player inserts or otherwise associates their player tracking card in the gaming machine. The central server/gaming device processor determines the player tracking level of the player and if the current player tracking level defined by the gaming system operator is eligible for a gaming device triggered bonus game. In one embodiment, the gaming system operator defines minimum bet levels required for a gaming device to trigger a bonus game based on the player's card level.

In another embodiment, a gaming device triggered bonus occurs by determining if any numbers allotted to a gaming device match a randomly selected number. In this embodiment, upon or prior to each play of each gaming machine, a gaming device selects a random number from a range of numbers and during each primary game, the gaming machine allocates the first N numbers in the range, where N is the number of credits bet by the player in that primary game. At the end of the primary game, the randomly selected number is compared with the numbers allocated to the player and if a match occurs, the gaming device triggers a bonus game and a determination occurs whether to display the triggered bonus game. It should be appreciated that any suitable manner of causing a gaming device to trigger a bonus game and then determining whether to display the triggered bonus game may be implemented in accordance with the gaming system and method disclosed herein.

In one embodiment, as mentioned above, the central server triggers a gaming system bonus game based on an outcome associated with one or more plays of any primary game and/or an outcome associated with one or more plays of any secondary game of the gaming machines in the gaming system. In one such embodiment, the central server's determination to trigger a gaming system bonus game is symbol driven based on the generation of one or more designated symbols or symbol combinations.

In another embodiment, the central server or remote host triggers a gaming system bonus in an apparently random fashion as perceived by the players of these gaming machines. In one embodiment, the gaming devices do not provide any apparent reasons to the players for the triggering of such a gaming system bonus. In this embodiment, the gaming system bonus is not triggered by an event in the primary game or based specifically on any of the plays of any primary game or on any of the plays of any secondary game of the gaming machines in the system. That is, such gaming system bonuses are triggered without any explanation or alternatively with simple explanations.

In another embodiment, the gaming system tracks the occurrences of one or more suitable events occurring at or in association with one or more players and/or one or more gaming devices in the gaming system and determines, based on these tracked events, whether the central server or remote host triggers a gaming system bonus. In another embodiment, the gaming system defines one or more game play parameters, wherein each time a player's tracked game play activity satisfies the defined parameter, the central server triggers a gaming system bonus.

In another embodiment, the central server determines to trigger a gaming system bonus based on an amount of coin-in. In this embodiment, the gaming system determines if an amount of coin-in wagered at one or more gaming devices in the gaming system reaches or exceeds a designated amount of coin-in (i.e., a gaming system triggered bonus threshold coin-in amount). Upon the amount of coin-in wagered at one or more gaming devices in the gaming system reaching or exceeding the gaming system triggered bonus threshold coin-in amount, the central server or remote host triggers a gaming system bonus. In different embodiments, the gaming system triggered bonus threshold coin-in amount is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day) or determined based on any other suitable method or criteria.

In another embodiment, the central server determines to trigger a gaming system bonus based on an amount of coin-out. In this embodiment, the gaming system determines if an amount of coin-out provided by one or more gaming devices in the gaming system reaches or exceeds a designated amount of coin-out (i.e., a gaming system triggered bonus threshold coin-out amount). Upon the amount of coin-out provided at one or more gaming devices in the gaming system reaching or exceeding the gaming system triggered bonus threshold coin-out amount, the central server or remote host triggers a gaming system bonus. In different embodiments, the gaming system triggered bonus threshold coin-out amount is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day) or determined based on any other suitable method or criteria.

In an alternative embodiment, the central server determines to trigger a gaming system bonus based on a predefined variable reaching a defined parameter threshold. For example, when the $500{,}000^{th}$ player has played a gaming machine of the gaming system (ascertained from a player tracking system), the central server or remote host triggers a gaming system bonus. In different embodiments, the predefined parameter thresholds include a length of time, a length of time after a certain dollar amount is hit, a wager level threshold for a specific machine (which gaming device is the first to contribute $250,000), a number of gaming machines active, or any other parameter that defines a suitable threshold.

In another embodiment, the central server determines to trigger a gaming system bonus based on time. In this embodiment, a time is set for when the central server or remote host triggers a gaming system bonus. In one embodiment, such a set time is based on historic data.

In another embodiment, the central server determines to trigger a gaming system bonus based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the central controller/gaming device processor recognizes the player's identification (via the player tracking system) when the player inserts or otherwise associates their player tracking card in the gaming machine. The central server/gaming device processor determines the player tracking level of the player and if the current player tracking level defined by the gaming system operator is eligible to cause a triggering of a gaming system bonus. In one embodiment, the gaming system operator defines minimum bet levels required to trigger a gaming system bonus based on the player's card level.

In another embodiment, the central server determines to trigger a gaming system bonus based on a system determination, which includes one or more random selections by the central controller. In one embodiment, the central controller tracks all active gaming machines and the wagers they placed. Each gaming machine has its own entry defining its state as either active or inactive and also defining the values of the wagers from that gaming machine. In one embodiment, active status means that the gaming machine is being actively played by a player and enrolled/inactive status means that the gaming machine is not being actively played by a player. The active status requirements can be based on any suitable number of satisfied criteria or defined in any suitable manner by the implementer of the gaming system. In one such embodiment, based on the gaming machine's state as well as one or more wager pools associated with the gaming machine, the central controller determines whether to trigger a gaming system bonus.

In another embodiment, the central server determines to trigger a gaming system bonus by determining if any numbers allotted to a gaming device match a randomly selected number. In this embodiment, upon or prior to each play of each gaming machine, a gaming device selects a random number from a range of numbers and during each primary game, the gaming machine allocates the first N numbers in the range, where N is the number of credits bet by the player in that primary game. At the end of the primary game, the randomly selected number is compared with the numbers allocated to the player and if a match occurs, the central server triggers a gaming system bonus. It should be appreciated that any suitable manner of a central server or remote host triggering a gaming system bonus may be implemented in accordance with the gaming system and method disclosed herein.

Figure 8:
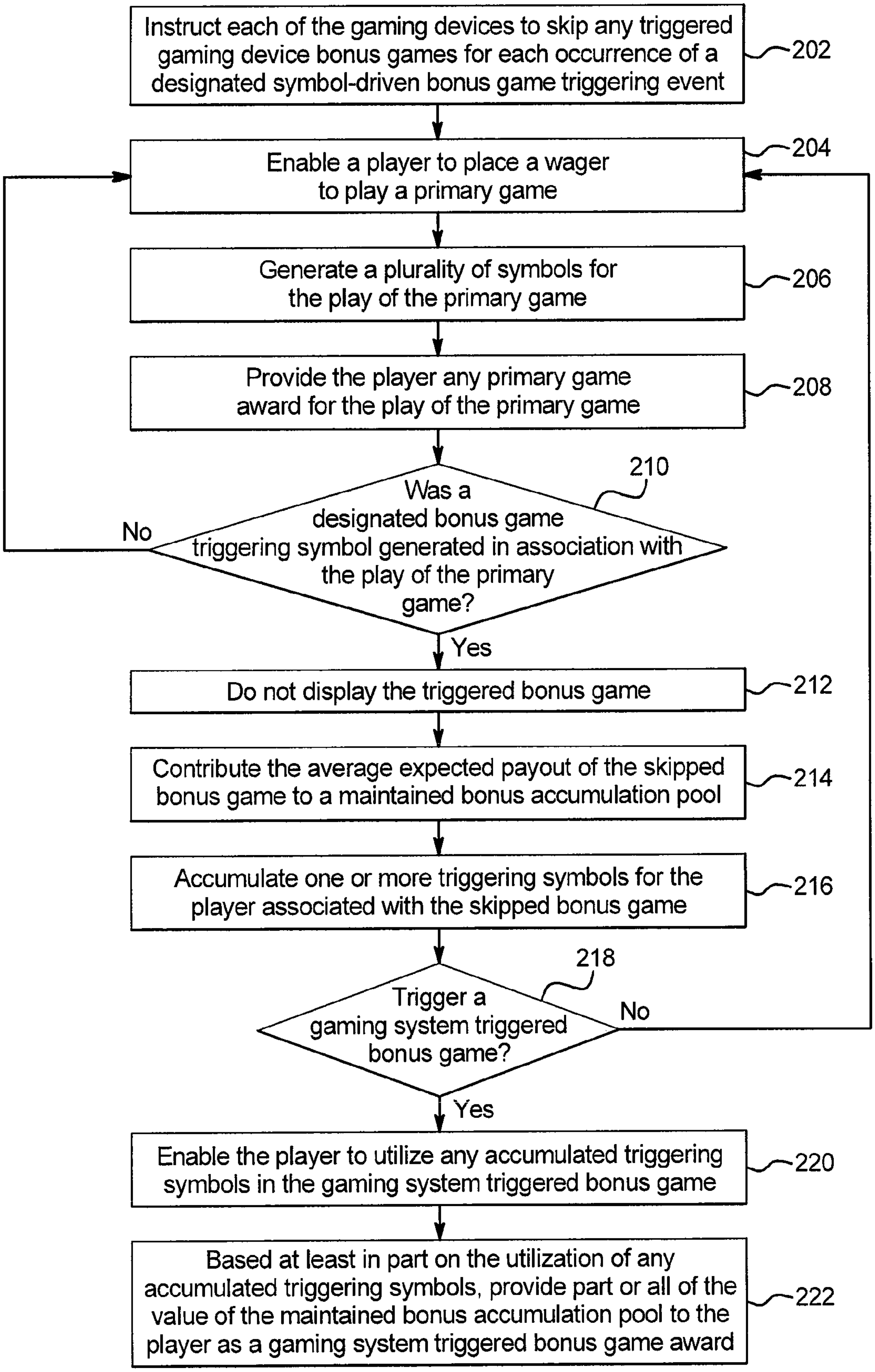
FIG. 8 is a flowchart of one embodiment of the gaming system disclosed herein illustrating an accumulation of a quantity of triggering symbols and the utilization of such accumulated triggering symbols to provide part or all of a bonus accumulation pool to a player.

Turning now to FIG. 8, in another embodiment, the gaming system instructs each of the gaming devices to skip any triggered gaming device bonus games for each occurrence of a designated symbol-driven bonus game triggering event as described above and indicated in block 202. In this embodiment, for each gaming device bonus game that is triggered upon a generation of a designated triggering symbol or a designated triggering symbol combination, the gaming system disables or otherwise turns off such gaming device triggered bonus games from being displayed and provided to the player.

After disabling any gaming device bonus game that would be triggered upon a designated symbol-driven bonus game triggering event, the gaming system enables a player to place a wager to play a primary game, generates a plurality of symbols for the play of the primary game and provides the player any primary game award for the play of the primary game as indicated in blocks 204, 206 and 208 and as described above. In this embodiment, the gaming system also determines if a designated bonus game triggering symbol (or designated bonus game triggering symbol combination) was generated in association with the play of the primary game as indicated in diamond 210. That is, the gaming system determines if the designated symbol-driven event occurred in association with the displayed play of the primary game.

If the designated bonus game triggering symbol (or designated bonus game triggering symbol combination) was not generated in association with the play of the primary game, the gaming device returns to the point of block 204 and enables the player to place another wager for another play of the primary game as described above. On the other hand, if the designated bonus game triggering symbol (or designated bonus game triggering symbol combination) was generated in association with the play of the primary game, the gaming system does not display the triggered bonus game and contributes the average expected payout of the skipped bonus game to a maintained bonus accumulation pool as indicated in blocks 212 and 214. That is, as described above, to fund the bonus accumulation pool with the average expected payout of the skipped bonus game, the gaming device communicates data or information to the central server regarding the skipped bonus game and one or more characteristics or attributes of the skipped bonus game.

In one embodiment, in addition to funding the bonus accumulation pool with the average expected payout of the skipped bonus game, the gaming system also accumulates one or more triggering symbols for the player associated with the skipped bonus game as indicated in block 216. In one such embodiment, for each symbol-driven bonus game triggering event that occurs (which the gaming system determines to skip or otherwise not provide to the player), the gaming system accumulates a quantity of triggering symbols or skipped bonus game units, wherein the quantity of accumulated triggering symbols or skipped bonus game units is based, at least in part, on the quantity of designated bonus game triggering symbols generated in association with the play of the primary game. For example, if a play of a primary game resulted in the generation of three bonus game triggering symbols (which are associated with a play of a gaming device bonus game with an average expected payout of fifty dollars for the wager placed on the primary game), the gaming system funds the bonus accumulation pool with fifty dollars and accumulates three triggering symbols for the player. In this example, if another play of the primary game resulted in the generation of one bonus game triggering symbol (which is also associated with a play of a gaming device bonus game with an average expected payout of fifty dollars for the wager placed on the primary game), the gaming system funds the bonus accumulation pool with another fifty dollars and accumulates one triggering symbol for the player. It should be appreciated that in this example embodiment, each occurrence of a triggering symbol contributes the same amount to the bonus accumulation pool, regardless of the quantity of triggering symbols generated.

In another embodiment, for each symbol-driven bonus game triggering event that occurs (which the gaming system determines to skip or otherwise not provide to the player), the gaming system funds the bonus accumulation pool and accumulates a quantity of triggering symbols or skipped bonus game units, wherein the amount contributed to the bonus accumulation pool and the quantity of accumulated triggering symbols or skipped bonus game units is based, at least in part, on the quantity of designated bonus game triggering symbols generated in association with the play of the primary game. In one such embodiment, the amount contributed to the bonus accumulation pool for each bonus game triggering event is based on the probability of that bonus game triggering event occurring. In one example, a bonus game triggering event associated with one triggering symbol is generated for the play of the primary game forty times, on average, for every time a bonus game triggering event associated with three triggering symbols is generated for the play of the primary game and a bonus game triggering event associated with two triggering symbols is generated for the play of the primary game ten times, on average, for every time a bonus game triggering event associated with three triggering symbols is generated for the play of the primary game. In this example, based on the relative probabilities of such bonus game triggering events occurring, the gaming system is configured such that if a play of a primary game resulted in the generation of three bonus game triggering symbols (which are associated with a play of a gaming device bonus game with an average expected payout of ten dollars for the wager placed on the primary game), the gaming system funds the bonus accumulation pool with ten dollars and accumulates three triggering symbols for the player. In this example, the gaming system is further configured such that if a play of a primary game resulted in the generation of one bonus game triggering symbol (which is associated with a play of a gaming device bonus game with an average expected payout of fifty-cents for the wager placed on the primary game), the gaming system funds the bonus accumulation pool with fifty cents and accumulates one triggering symbol for the player and if a play of a primary game resulted in the generation of two bonus game triggering symbols (which are associated with a play of a gaming device bonus game with an average expected payout of two dollars for the wager placed on the primary game), the gaming system funds the bonus accumulation pool with two dollars and accumulates two triggering symbols for the player. It should be appreciated that in this example embodiment, while different quantities of generated triggering symbols each cause an occurrence of a bonus game triggering event, different quantities of generated triggering symbols contribute different amounts to the bonus accumulation pool and cause different quantities of triggering symbols to be accumulated.

In one embodiment, each accumulated triggering symbol has a theoretical value or average expected value which is based on the average expected payout of the skipped gaming device triggered bonus game or payout. For example, if a player forgoes a gaming device triggered bonus game with an average expected payout of fifty dollars, fifty dollars are contributed to the bonus accumulation pool and the player accumulates one triggering symbol, that one accumulated triggering symbol has a theoretical value of fifty dollars. It should be appreciated that such values are theoretical because prior to being utilized or otherwise redeemed in association with one or more gaming system triggered bonus games (as described below), an actual value for such accumulated triggering symbols cannot be determined until one or more random determinations occur in association with the utilization or redemption of such an accumulated triggering symbol.

In one embodiment, after accumulating a quantity of triggering symbols for the player, the gaming system determines whether to trigger a gaming system triggered bonus game as described above and indicated in diamond 218 of FIG. 8. In one such embodiment, the gaming system triggered bonus game is initiated or triggered for each player when such players initiate play of a primary game. In this embodiment, the gaming system triggered bonus game is ongoing and played concurrently with the play of one or more primary wagering games. In another such embodiment, the gaming system triggered bonus game is triggered subsequent to or based on the play of one or more primary wagering games.

If the gaming system determines not to trigger a gaming system bonus game (or determines that a player may not join or participate in an ongoing gaming system bonus game), the gaming system returns to block 204 and enables the player to place another wager for another play of the primary game as described above. On the other hand, if the gaming system determines to trigger a gaming system bonus game (or determines that a player may join or participate in an ongoing gaming system bonus game), the gaming system enables the player to utilize any accumulated triggering symbols in the gaming system triggered bonus game as indicated in block 220. In this embodiment, based at least in part on the utilization of any accumulated triggering symbols, the gaming system provides part or all of the value of the maintained bonus accumulation pool to the player as a gaming system triggered bonus game award as indicated in block 222 of FIG. 8.

In one embodiment, if a player utilizes any accumulated triggering symbols in the gaming system triggered bonus game, such a gaming system triggered bonus game includes one or more random determinations to determine the gaming system triggered bonus game award that is provided to the player. In this embodiment, the actual value of each redeemed triggering symbol for a player is determined based on this gaming system triggered bonus game award. For example, if a player utilizes five accumulated triggering symbols (each with a theoretical value of fifty dollars) and is provided a gaming system triggered bonus game award of five-hundred dollars, then the actual value associated with each utilized triggering symbol is one-hundred dollars. Thus, the gaming system disclosed herein provides for the accumulation of triggering symbols that have a theoretical or average expected value prior to being utilized or redeemed and have an actual value after being utilized or redeemed, wherein the theoretical value and the actual value may differ. Accordingly, this embodiment provides that the gaming system utilizes a gaming system triggered bonus to redistribute the theoretical average expected payouts contributed from the skipped gaming device triggered bonus games.

In one embodiment, a player's probability of winning the gaming system triggered bonus game award is based, at least in part, on that player's quantity of accumulated triggering symbols. In this embodiment, the greater a player's quantity of accumulated triggering symbols, the greater that player's probability of winning part or all of the value of the maintained bonus accumulation pool.

In one such embodiment wherein a player's probability of winning part or all of the bonus accumulation pool is based on a player's quantity of triggering symbols, the gaming system enables a player to accumulate and utilize such triggering symbols (and provides an amount of the bonus accumulation pool to one or more players) via a multi-round gaming system accumulation game. In one embodiment, upon an initiation of a gaming system accumulation game, the gaming system enables each eligible player to participate in a first round of the gaming system accumulation game as indicated in block 230 of FIG. 9. In this embodiment, participation in the first round of the gaming system accumulation game includes enabling a player to play one or more wagering games, accumulating zero, one or more triggering symbols for the player and contributing the average expected payout of any skipped bonus games (which are triggered as a result of any generated triggering symbols) to a maintained bonus accumulation pool as described above. That is, each round of the gaming system accumulation game is played concurrently with the wagered on plays of one or more primary games.

For example, as seen in FIG. 10, the gaming system enables each eligible player to participate in the first round of the gaming system accumulation game, wherein the generation of one triggering symbol causes a bonus game to be skipped, the average expected payout of $50.00 for the skipped bonus game to be contributed to the bonus accumulation pool and the player that played the wagering game associated with this generated triggering symbol to accumulate one triggering symbol. In this example embodiment, although one generated triggering symbol causes the bonus game to be skipped, the gaming system accumulates a plurality of triggering symbols for a player at a gaming device that generated a plurality of triggering symbols such that the generation of two triggering symbols causes a bonus game to be skipped, the average expected payout of $50.00 for the skipped bonus game to be contributed to the bonus accumulation pool and the player that played the wagering game associated with these generated triggering symbols to accumulate two triggering symbols. Moreover, in this example, the generation of three triggering symbols causes a bonus game to be skipped, the average expected payout of $50.00 for the skipped bonus game to be contributed to the bonus accumulation pool and the player that played the wagering game associated with these generated triggering symbols to accumulate three triggering symbols.

Figure 9:
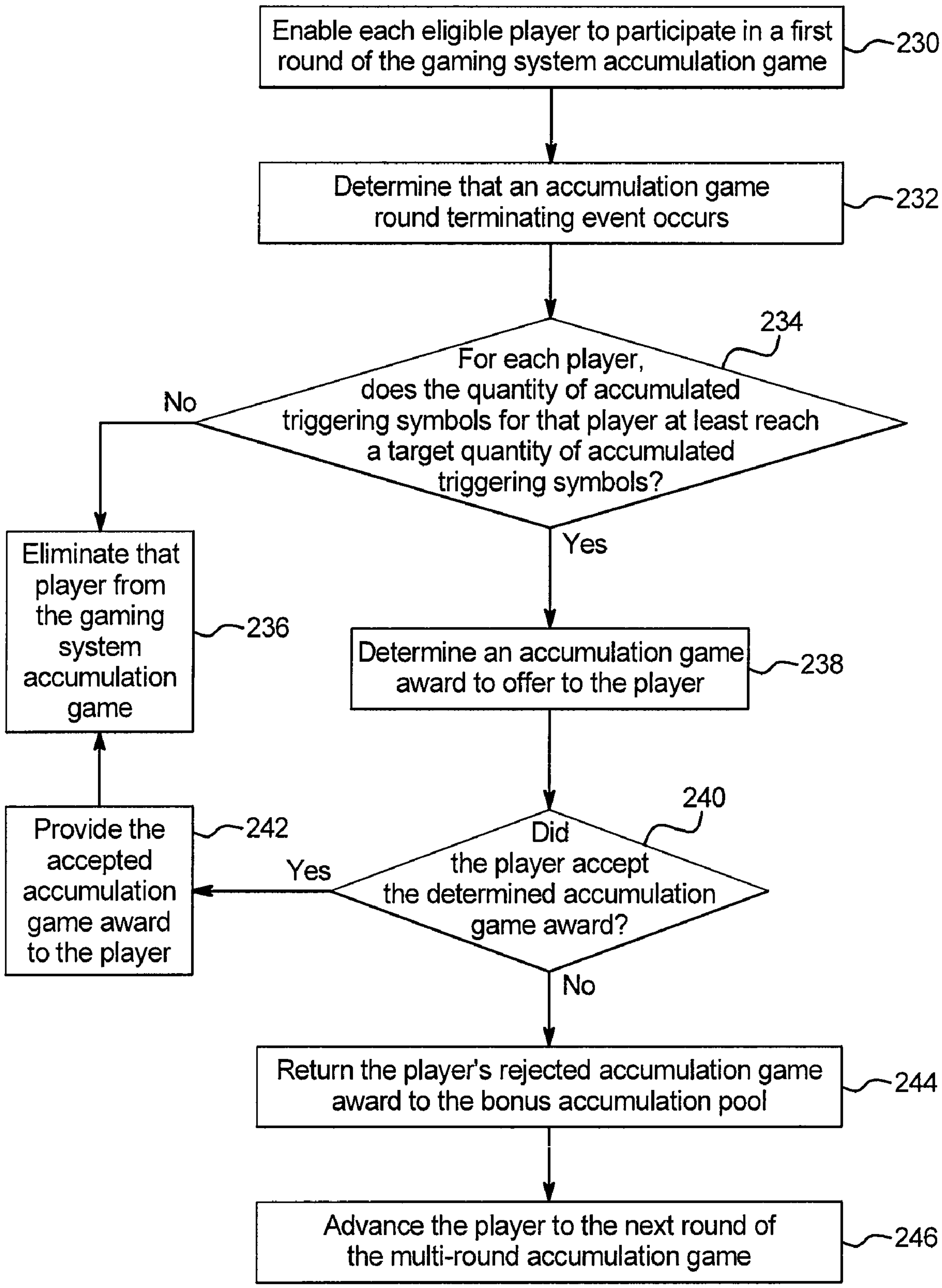
FIG. 9 is a flowchart of one embodiment of the gaming system disclosed herein illustrating an accumulation game award offered to a player to accept or reject if the player accumulates at least a target quantity of triggering symbols.

In one embodiment, each eligible player participates in the current round of the gaming system triggered accumulation game until the gaming system determines that an accumulation game round terminating event occurs as indicated in block 232 of FIG. 9. In one embodiment, the accumulation game round terminating event occurs after a designated period of time. For example, the first round of the gaming system accumulation game runs for five minutes wherein each eligible player is enabled to play one or more wagering games and accumulate zero, one or more triggering symbols during the five minutes of the first round.

Upon the accumulation game round terminating event, for each player, the gaming system determines whether the quantity of accumulated triggering symbols for that player at least reaches a target quantity of accumulated triggering symbols as indicated in diamond 234. In this embodiment, if a player's quantity of accumulated triggering symbols is below the target quantity of accumulated triggering symbols, the gaming system eliminates that player from the gaming system accumulation game as indicated in block 236. On the other hand, if a player's quantity of accumulated triggering symbols is at least the target quantity of accumulated triggering symbols, the gaming system determines an accumulation game award (i.e., a gaming system triggered bonus game award) to offer the player and enables the player to accept or reject the determined accumulation game award as indicated in block 238 and diamond 240.

For example, as seen in FIG. 10, if the target quantity of accumulated triggering symbols for the first round of this accumulation game is three accumulated triggering symbols, then the gaming system determines that Player A, Player B, Player C and Player G each accumulated at least the target quantity of three triggering symbols and thus such players will each be offered an accumulation game award. As also seen in FIG. 10, the gaming system determines that Player D, Player E, Player F and Player H each did not accumulate the target quantity of three triggering symbols and thus such players are eliminated from the accumulation game. As seen in this example, even though Player B and Player F each caused one bonus game to be skipped and each caused a contribution of $50.00 to the bonus accumulation pool, since Player B generated three triggering symbols in association with Player B's play of the wagering game that caused a bonus game to be skipped and Player F generated one triggering symbol in association with Player F's play of the wagering game that caused a bonus game to be skipped, Player B qualifies for an accumulation game award offer and Player F does not. Thus, this embodiment of the gaming system provides that a player's probability of being offered an accumulation game award is based not only on a play of wagering game resulting in the skipping of a bonus game but also on the quantity of triggering symbols generated in association with that play of the wagering game that resulted in the skipping of the bonus game.

In one embodiment, the accumulation game award (i.e., the gaming system triggered bonus game award for the gaming system triggered accumulation bonus game) offered to each player that accumulated at least the target quantity of accumulated triggering symbols is based on the current amount in the maintained bonus accumulation pool and the current round of the gaming system triggered accumulation game. In this embodiment, the gaming system determines that for each round of the accumulation game, a certain portion of the bonus accumulation pool will be offered to players in the form of accumulation game awards, wherein each player's relative portion of this portion of the bonus accumulation pool is based on the total number of players that accumulated at least the target quantity of accumulated triggering symbols. For example, at the end of the first round, 10% of the maintained bonus accumulation pool will be offered to the players who reached the target quantity of accumulated triggering symbols. In this example, as seen in FIG. 10, if the bonus accumulation pool for the plays of the wagering games played in association with this accumulation game is currently at $400 and four players (i.e., Player A, Player B, Player C and Player G) each reached the target quantity of accumulated triggering symbols, then $10 (or $400×10%/4 players) is offered to each player.

In one such embodiment, in addition to offering such players an accumulation game award for successfully completing the current round of the gaming system accumulation game, the gaming system also displays to each player a minimum amount of an accumulation game award the player would win if they reject the current offered accumulation game award and continue to the next round of the gaming system accumulation game. For example, if the portion of the bonus accumulation pool allocated to the second round of the gaming system accumulation game is 25%, the gaming system determines that with a current bonus accumulation pool of $400, at least $100 ($400×25%) will be available to be split amongst the players that reach a target quantity of triggering symbols for the second round. In this example, the gaming system displays to each player (that accumulated the target quantity of triggering symbols) that they can accept the current accumulation game award of $10 or proceed to the next round for a chance to be offered an accumulation game award of at least $25 (or $400×25%/4 players).

Referring back to FIG. 9, if a player accepts the offered accumulation game award, the gaming system provides the accepted accumulation game award to the player and eliminates that player from the gaming system accumulation game as indicated in blocks 242 and 236. For example, if Player G accepts the accumulation game award offer of $10, Player G is provided $10 and Player G is eliminated from the gaming system accumulation game. On the other hand, if the player rejects (i.e., does not accept) the accumulation game award, the player's rejected accumulation game award is returned to the bonus accumulation pool and the player advances to the next round of the gaming system accumulation game as indicated in blocks 244 and 246. For example, if Player A rejects the accumulation game award offer of $10, then $10 is returned to the bonus accumulation pool and Player A proceeds to the next round of the gaming system accumulation game.

The next round of the gaming system accumulation game proceeds as described above with each player that qualified to participate for the next round playing one or more wagering games and accumulating zero, one or more triggering symbols (wherein each accumulated triggering symbol causes the average expected payout of a skipped bonus game to be contributed to the maintained bonus accumulation pool) as described above. In one such embodiment, one or more subsequent rounds proceed with an increased portion of the bonus accumulation pool offered to players in the form of accumulation game awards and/or an increased target quantity of accumulated triggering symbols. For example, as seen in FIG. 11, the gaming system provides a second round of the gaming system accumulation game wherein 25% of the bonus accumulation pool is allocated for the accumulation game awards of the second round and a player must accumulate five triggering symbols to be offered an accumulation game award for this second round. In this example, at the end of the second round, if another $200 has been added to the bonus accumulation pool (due to the skipping of gaming device bonus games), and three players reached the target quantity of five accumulated triggering symbols, then $50 (or $600×25%/3 players) is offered to each player. It should be appreciated that In this example, since one less player qualified to be offered an accumulation game award than the previous round and an additional $200 was contributed to the bonus accumulation pool (from the conclusion of the previous round), each player's accumulation game award offered for completing this second round is $50 which is greater than the displayed minimum amount of $25 for the second round accumulation game offer award described above.

This process continues as described above until each of the players are eliminated from the gaming system accumulation game, each of the players accept an offered accumulation game award, or each of the player's complete the final round of the gaming system accumulation game. In this embodiment, if each of the players accept an offered accumulation game award and none of the players complete the final round of the gaming system accumulation game, then the amount in the bonus accumulation pool is rolled over to a subsequent gaming system accumulation game. Accordingly, such a gaming system accumulation game provides that players that are placing wagers at a greater frequency have a greater probability of accumulating the target quantity of triggering symbols in each round and thus have a greater probability of advancing to subsequent rounds to win greater gaming system triggered bonus awards.

In another embodiment, a player's quantity of accumulated triggering symbols determines, at least in part, the amount of a player's gaming system triggered bonus game award. In this embodiment, the greater a player's quantity of accumulated triggering symbols, the greater that player's portion of the bonus accumulation pool.

In one such embodiment wherein a player's quantity of accumulated triggered symbols determines, at least in part, the amount of that player's gaming system triggered bonus game award, the gaming system enables a player to redeem or otherwise utilize any accumulated triggering symbols in a gaming system triggered auction sequence. In this embodiment, the gaming system accumulates zero, one or more triggering symbols (as described above), funds the bonus accumulation pool with the average expected payouts of any bonus games resulting from the generation of any triggering symbols (as also described above), and enables a player to bid a quantity of any accumulated triggering symbols in one or more gaming system triggered auction sequences. In this embodiment, if a player wins a gaming system triggered auction sequence, at least part of the bonus accumulation pool is provided to the player as a gaming system triggered bonus award.

In one embodiment, at a designated point in time, a gaming system triggered auction sequence begins. In one such embodiment, each gaming system triggered auction sequence is at least associated with a minimum bid amount for that gaming system triggered auction sequence. That is, each gaming system triggered auction sequence is associated with a minimum amount of accumulated triggering symbols that a player must bid to participate in that gaming system triggered auction sequence. For example, a gaming system triggered auction sequence is associated with a minimum bid amount of five accumulated triggering symbols.

Figure 12A:
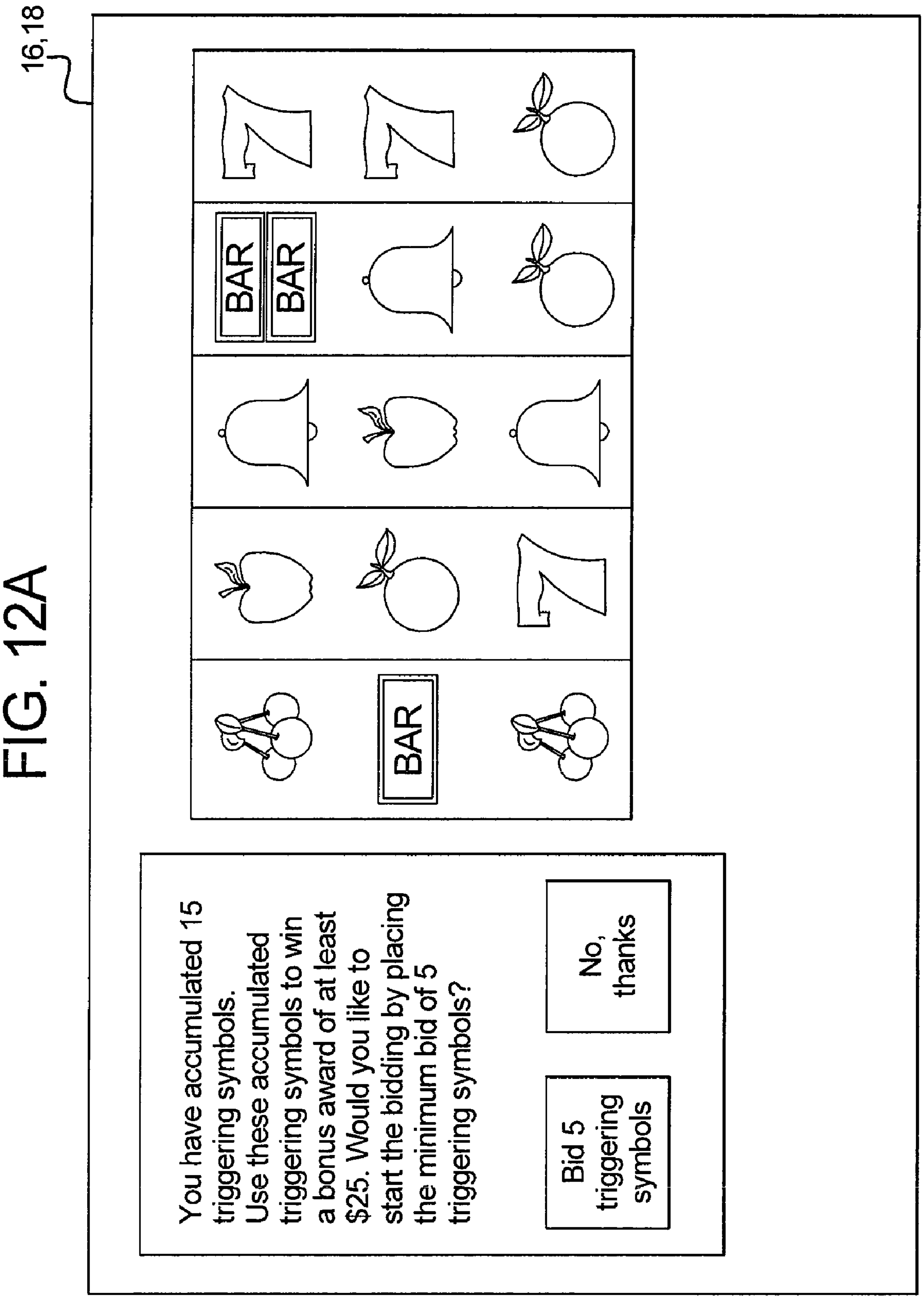
FIGS. 12A and 12B are enlarged elevation views of the display of one embodiment of a gaming device of the gaming system disclosed herein illustrating a display of information to a player regarding the player's current quantity of accumulated triggering symbols and the results of a gaming system triggered auction sequence.

In another embodiment, each gaming system triggered auction sequence is further at least associated with a minimum gaming system triggered bonus award that may be won for placing the highest bid in the gaming system triggered auction sequence. In this embodiment, the minimum gaming system triggered bonus award is based, at least in part, on the minimum quantity of triggering symbols of the winning bid, a minimum value associated with each bid triggering symbol and a portion of the maintained bonus accumulation pool. For example, if a gaming system triggered auction sequence is associated with a minimum bid amount of five accumulated triggering symbols, each triggering symbol redeemed during the triggered auction sequence will have a minimum value of $1 and 5% of a maintained bonus accumulation pool of $400 is allocated to this triggered auction sequence, the minimum gaming system triggered bonus award is $25 (or $5 (5 redeemed triggering symbols×$1 per redeemed triggering symbol)+$20 (5% of $400 bonus accumulation pool). As seen in FIG. 12A, prior to the beginning of a gaming system triggered auction sequence, a gaming device displays to a player that qualifies such information to the player. In this Illustrated example, the gaming device displays appropriate messages such as "YOU HAVE ACCUMULATED 15 TRIGGERING SYMBOLS. USE THESE ACCUMULATED TRIGGERING SYMBOLS TO WIN A BONUS AWARD OF AT LEAST $25." and "WOULD YOU LIKE TO START THE BIDDING BY PLACING THE MINIMUM BID OF 5 TRIGGERING SYMBOLS?" to the player visually, or through suitable audio or audiovisual displays.

In one embodiment, the gaming system utilizes at least part or all of a display device on one or more gaming devices to display: (i) the quantity of triggering symbols available to the player to bid in a gaming system triggered auction sequence, (ii) any currently running gaming system triggered auction sequences, (iii) any upcoming gaming system triggered auction sequences, (iv) the minimum gaming system triggered bonus award for the player that places the winning bid in the gaming system triggered auction sequence, (v) the minimum amount of accumulated triggering symbols that must be redeemed or exchanged to participate in each gaming system triggered auction sequence, (vi) the current highest bid amount of accumulated triggering symbols, (vii) which gaming device and/or player has placed the current highest bid amount of accumulated triggering symbols, (viii) any help screens to describe the gaming system triggered auction sequence to the player, and (ix) any other information related to a player, one or more gaming system triggered auction sequences or the gaming establishment. In one such embodiment, the gaming system utilizes one or more service windows, pop-up windows or non-overlapping windows, such as described in U.S. Published Patent Application No. 2007/0243925 to convey any suitable information to the player.

It should be appreciated that although the gaming system displays to the player the minimum gaming system triggered bonus award for the player that places the winning bid in the gaming system triggered auction sequence, the gaming system does not display an actual value for such a gaming system triggered bonus award. That is, as described below, the actual gaming system triggered bonus award for the player that places the winning bid in the gaming system triggered auction sequence is determined based on one or more random determinations and cannot be determined until after such random determinations occur. Accordingly, the gaming system disclosed herein provides a gaming system triggered auction sequence in which players bid on a gaming system triggered bonus award of an unknown value to the player. Such a gaming system triggered auction sequence is in contrast to traditional auction games wherein players bid on a known quantity of items having a known value.

In one embodiment, if a gaming system triggered auction sequence is currently in progress, then during the predetermined amount of time which that gaming system triggered auction sequence runs, the gaming system enables any players with at least one accumulated triggering symbol (or a designated amount of accumulated triggering symbols) to bid on an gaming system triggered bonus award with an unknown value. In different embodiments, the gaming system enables such players to place or make bids using a variety of different input methods, such as touching a symbol on a screen with bids higher than previous bids or inputting their bid on a keypad.

In one embodiment, a gaming system triggered auction sequence ends (i.e., an auction sequence terminating event occurs) after a predetermined amount of time. In another embodiment, a gaming system triggered auction sequence ends (i.e., an auction sequence terminating event occurs) after a length of time which is based on player activity or player inactivity. For example, if all players stop bidding in a gaming system triggered auction sequence for a designated amount of time, such as five seconds, the gaming system concludes the gaming system triggered auction sequence.

In one embodiment, after the gaming system triggered auction sequence concludes, the gaming system determines which player placed the winning auction bid (i.e., which player placed the highest auction bid). In this embodiment, players that play more primary games have more chances of accumulating triggering symbols and the greater quantity of triggering symbols a player accumulates, the greater amount a player may bid in the gaming system triggered auction sequence. Thus, such a gaming system triggered auction sequence provides that players that are placing wagers at a greater frequency have a greater probability of accumulating triggering symbols to bid in the auction sequence and thus have a greater probability of winning a gaming system triggered bonus award for placing the winning bid.

For the player determined to place the winning bid, the gaming system determines a gaming system triggered bonus award based, at least in part, on the quantity of triggering symbols of the winning bid, a random determination of a value of each triggering symbol of the winning bid and the current value of the maintained bonus accumulation pool. In this embodiment, the gaming system randomly determines, based on a plurality of weighted values, a value for each redeemed triggering symbols of the winning bid. Based on this randomly determined value, the quantity of redeemed triggering symbols in the winning bid and the current value of the portion of the maintained bonus accumulation pool that is allocated to this triggered auction sequence, the gaming system determines a gaming system triggered bonus award for this triggered auction sequence.

Figure 12B:
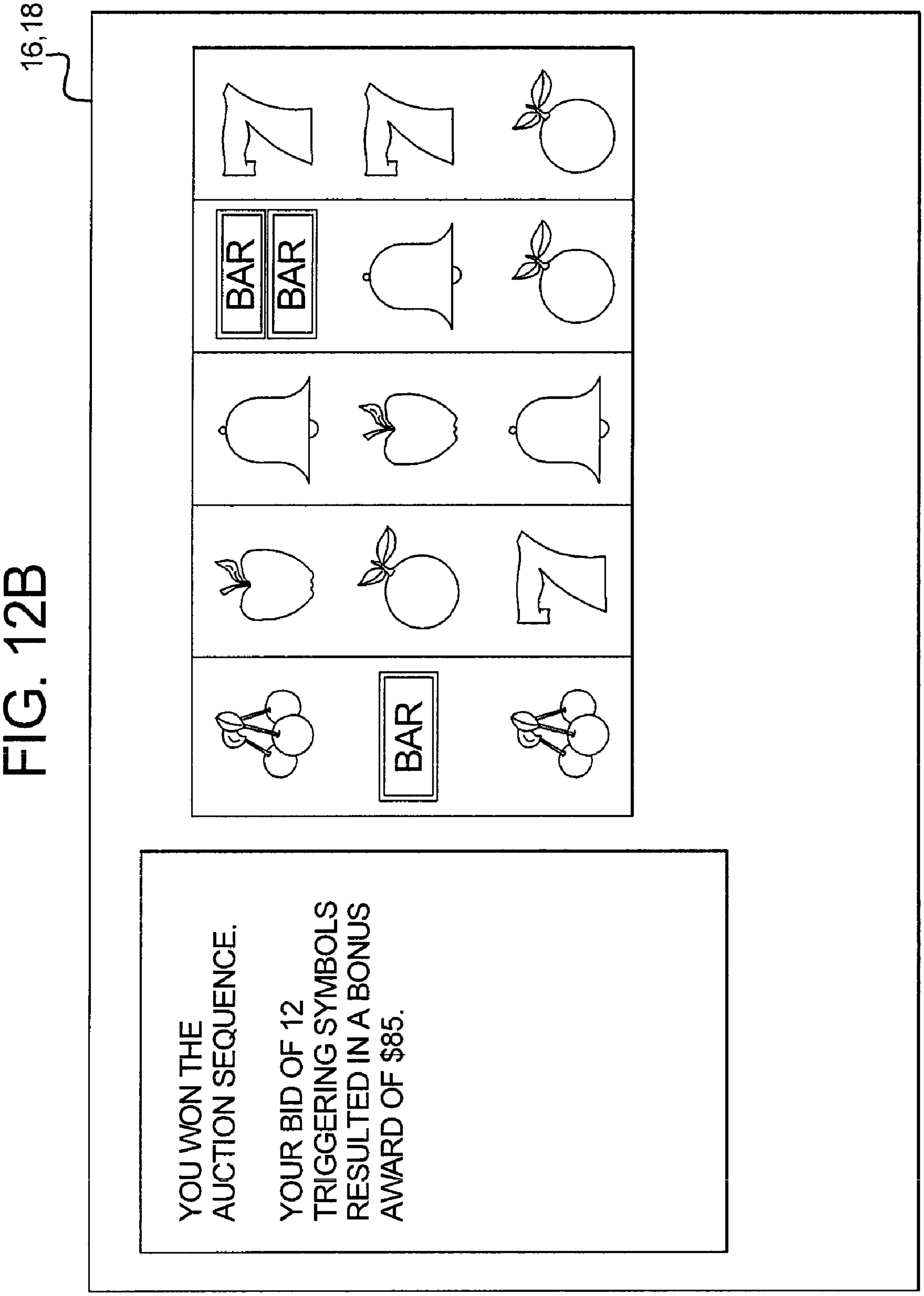

For example, utilizing the weighted values of Table A (illustrated below), the gaming system randomly determines that each redeemed triggering symbol for this triggered auction sequence has a value of five dollars. In this example, if the winning bid is 12 redeemed triggering symbols and the current value of the portion of the maintained bonus accumulation pool that is allocated to this triggered auction sequence is $25 (5% of a current bonus accumulation pool of $500), the player that placed the winning bid Is provided a gaming system triggered bonus award of $85 (or 12 redeemed triggering symbols×$5 per redeemed triggering symbol+$25 as the current value of the portion of the maintained bonus accumulation pool that is allocated to this triggered auction sequence). In accordance with Table A, the average determined value for each redeemed triggering symbol is $3 such that in this case, the determined value of $5 per redeemed triggering symbol is greater than the average value of $3 per redeemed triggering symbol. Moreover, for this triggered auction sequence, the minimum gaming system triggering bonus award the player may have won was $37 (or 12 redeemed triggering symbols×$1 per redeemed triggering symbol+$25 as the current value of the portion of the maintained bonus accumulation pool that is allocated to this triggered auction sequence), and the maximum gaming system triggering bonus award the player may have won was $145 (or 12 redeemed triggering symbols×$10 per redeemed triggering symbol +$25 as the current value of the portion of the maintained bonus accumulation pool that is allocated to this triggered auction sequence). As seen in FIG. 12B, upon determining a gaming system triggered bonus award for this triggered auction sequence, the gaming device provides the player that placed the winning bid the determined gaming system triggered bonus award. In this illustrated example, the gaming device displays appropriate messages such as "YOU WON THE AUCTION SEQUENCE" and "YOUR BID OF 12 TRIGGERING SYMBOLS RESULTED IN A BONUS AWARD OF $85" to the player visually, or through suitable audio or audiovisual displays.

TABLE A

| Value for each redeemed triggering symbol | Probability of value being selected |
|---|---|
| 1 | 10% |
| 2 | 31% |
| 3 | 32% |
| 4 | 16% |
| 5 | 6% |
| 6 | 3% |
| 10 | 2% |

In another embodiment, for the player determined to place the winning bid, the gaming system determines a gaming system triggered bonus award based, at least in part, on the quantity of triggering symbols of the winning bid, the results of one or more random determination games and the current value of the maintained bonus accumulation pool. In this embodiment, the gaming system randomly determines, based on the results of one or more random determinations games, such as the results of one or more free spins or free activations, a value for each redeemed triggering symbols of the winning bid. Based on this randomly determined value (or these randomly determined values), the quantity of redeemed triggering symbols in the winning bid and the current value of the portion of the maintained bonus accumulation pool that is allocated to this triggered auction sequence, the gaming system determines a gaming system triggered bonus award for this triggered auction sequence.

After providing the player that placed the winning bid with the determined gaming system triggered bonus award, the gaming system reduces this player's quantity of accumulated triggering symbols with an amount of triggering symbols equal to their winning bid, maintains each of the remaining player's quantities of accumulated triggering symbols and awaits another gaming system triggered auction sequence to begin. In this embodiment, the gaming system further reduces the bonus accumulation pool by the amount of the gaming system triggered bonus award provided to the player that placed the winning bid.

In one embodiment, if a player decides not to participate in a gaming system triggered auction sequence (or if a player fails to place the winning bid in a gaming system triggered auction sequence), the gaming system enables the player to redeem a quantity of accumulated triggering symbols in a random determination game that utilizes the same table of weighted values (as illustrated above in Table A) to determine the value of each redeemed triggering symbol as described above. In this embodiment, if a player redeems a quantity of accumulated triggering symbols in such a random determination game, the gaming system triggered bonus award provided to that player is funded by the amount in the maintained bonus accumulation pool but does not include any additional portion of the bonus accumulation pool. For example, utilizing the weighted values of Table A, if a player decides not to participate in a gaming system triggered auction sequence (or if a player fails to place the winning bid in a gaming system triggered auction sequence), the gaming system randomly determines that each redeemed triggering symbol for this triggered auction sequence has a value of five dollars. In this example, if a player does not participate in the auction sequence and redeems 12 triggering symbols, the player is provided a gaming system triggered bonus award of $60 (or 12 redeemed triggering symbols×$5 per redeemed triggering symbol). Accordingly, a player that places a winning bid in a gaming system triggered auction sequence is provided an additional portion of the maintained bonus accumulation pool that is allocated to that triggered auction sequence.

In another embodiment, if a player decides not to participate in a gaming system triggered auction sequence (or if a player fails to place the winning bid in a gaming system triggered auction sequence), the gaming system enables the player to redeem a quantity of accumulated triggering symbols in a random determination game that utilizes a table with different weighted values to determine the value of each redeemed triggering symbol as described above. In this embodiment, if a player redeems a quantity of accumulated triggering symbols in such a random determination game, the gaming system triggered bonus award provided to that player is funded by the amount in the maintained bonus accumulation pool but does not include any additional portion of the bonus accumulation pool.

In one embodiment, a player's probability of winning a gaming system triggered bonus game award is based, at least in part, on that player's frequency or rate of accumulating triggering symbols. In this embodiment, the greater the frequency or rate a player accumulates triggering symbols, the greater that player's probability of winning part or all of the value of the maintained bonus accumulation pool.

In one such embodiment wherein a player's probability of winning a gaming system triggered bonus game award is based, at least in part, on that player's frequency of accumulating triggering symbols, the gaming system enables a player to utilize such accumulated triggering symbols in an ongoing gaming system competitive maze or path-type game. In this embodiment, for each accumulated triggering symbol (or each quantity of accumulated triggering symbols), the gaming system enables a player to make one or more moves within a maze. That Is, this embodiment provides that In exchange for a quantity of triggering symbols, the gaming system enables a player to make a move through a maze to reach a destination. If the player finds or reaches a prize within the maze, the gaming system provides the player a gaming system triggered bonus award which is based, at least in part, on the current value of the maintained bonus accumulation pool. In this embodiment, the distance the player moves through the maze depends on the player's accumulated quantity of triggering symbols. Thus, players who play faster may accumulate greater quantities of triggering symbols over a designated period of time and may move faster through the maze to obtain gaming system triggered bonus awards before other players. Such a gaming system triggered maze game provides that players that are placing greater wagers and/or placing wagers at a greater frequency over a designated period of time have a greater probability of accumulating triggering symbols (i.e., moves in the maze) and thus have a greater probability of finding a prize in the maze to win a gaming system triggered bonus award.

Figure 13:
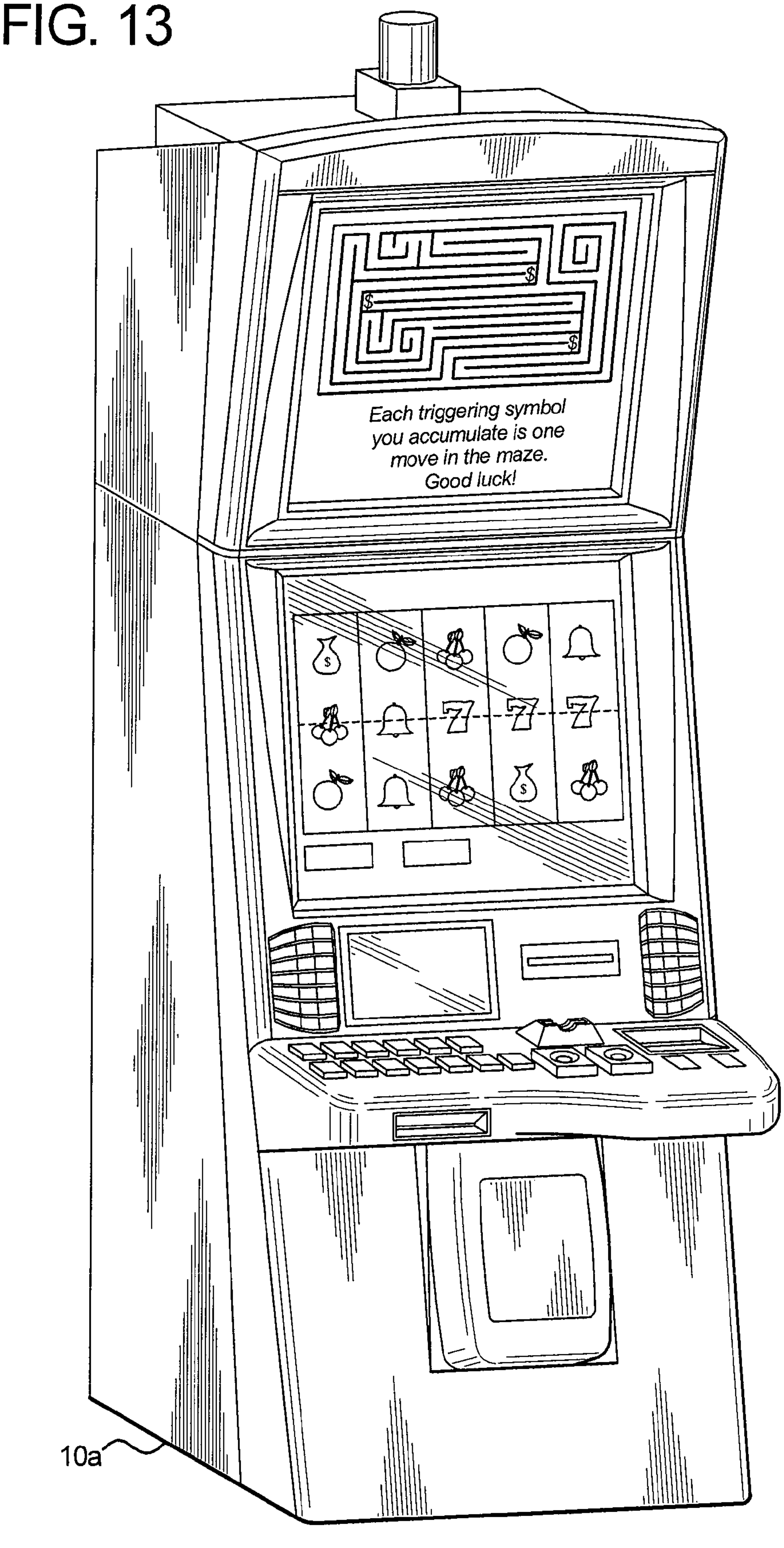
FIG. 13 is an enlarged elevation view of the display of one embodiment of a gaming device of the gaming system disclosed herein bonus game.

In operation of one embodiment, as players are playing one or more primary games, each time a triggering symbol is generated and accumulated (and the average expected payout of the skipped bonus game associated with this generated triggering symbol is contributed to the bonus accumulation pool), the gaming system converts this quantity of accumulated triggering symbols into a quantity of moves for the player throughout the maze. As seen in FIG. 13, a gaming device displays a maze including a plurality of awards to a player and informs the player of how to move through the maze to collect such awards. In this illustrated example, the gaming device displays appropriate messages such as "EACH TRIGGERING SYMBOL YOU ACCUMULATE IS ONE MOVE IN THE MAZE" and "GOOD LUCK" to the player visually, or through suitable audio or audiovisual displays.

In this embodiment, if a player moves throughout the maze and locates a gaming system triggered bonus award in the maze, the player is provided the located gaming system triggered bonus award and that gaming system triggered bonus award is removed from the maze. That is, the gaming system maze game provides a competitive gaming system triggered bonus wherein a plurality of players compete for a limited number of gaming system triggered bonus awards that populate the maze. In one embodiment, once a player moves to and locates a gaming system triggered bonus award, the gaming system notifies each of the other players participating in the maze group bonus that a gaming system triggered bonus award has been won.

In one embodiment, each gaming system triggered bonus award in the maze is a progressive award that increments based off of the contributions to the bonus accumulation pool that result from any skipped gaming device triggered bonus games. In this embodiment, as more triggering symbols are accumulated and more gaming device triggered bonus games are skipped, greater amounts are contributed to the bonus accumulation pool and the larger such gaming system triggered progressive bonus awards will grow in value. For example, if five gaming system triggered progressive bonus awards populate a maze, then for each contribution to the bonus accumulation pool, (i) 7% of that contribution is allocated to a first gaming system triggered progressive bonus award populated in the maze, (ii) 17% of that contribution is allocated to a second gaming system triggered progressive bonus award populated in the maze, (iii) 20% of that contribution is allocated to a third gaming system triggered progressive bonus award populated in the maze, (iv) 23% of that contribution is allocated to a fourth gaming system triggered progressive bonus award populated in the maze and (v) 33% of that contribution is allocated to a fifth gaming system triggered progressive bonus award populated in the maze. In this example, if at a certain point In time the maintained bonus accumulation pool includes $3,000, then following the allocation table described above, at this point in time, (i) the first gaming system triggered progressive bonus award populated in the maze has a current value of $1,000, (ii) the second gaming system triggered progressive bonus award populated in the maze has a current value of $700, (iii) the third gaming system triggered progressive bonus award populated in the maze has a current value of $600, (iv) the fourth gaming system triggered progressive bonus award populated In the maze has a current value of $500, and (v) the fifth gaming system triggered progressive bonus award populated in the maze has a current value of $200.

In one embodiment, if one of these gaming system triggered progressive bonus awards is located by (and subsequently provided to) a player participating in the gaming system maze game, then the allocated contribution of the bonus accumulation pool for this progressive bonus award is reallocated amongst the remaining progressive bonus awards still populating the maze. In another embodiment, if one of these gaming system triggered progressive bonus awards is located by (and subsequently provided to) a player participating in the gaming system maze game, then the allocated contribution of the bonus accumulation pool for this progressive bonus award is put into a hidden or reserve gaming system triggered progressive bonus award for the next play of the maze group bonus.

In another embodiment, the gaming system enables a player to purchase a designated quantity of triggering symbols. In this embodiment, rather than accumulating triggering symbols based on one or more aspects of game play, the gaming system enables the player to directly or indirectly purchase one or more triggering symbols. In different embodiments, the quantity of triggering symbols which the player may purchase and/or the cost of each purchased triggering symbol is predetermined, randomly determined, determined based on a generated symbol or symbol combination, determined based on a random determination by the central controller, determined based on a random determination by one or more gaming devices, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria.

In another embodiment, the gaming system funds a player's account with one or more triggering symbols in association with a promotion. In this embodiment, the gaming system accumulates one or more triggering symbols for a player for accepting or participating in a promotion. For example, in exchange for signing up for a gaming establishment's player loyalty club, for visiting a gaming establishment's website or some activity thereon, such as learning about a new game, or for trying a new game, the gaming system accumulates one or more triggering symbols for the player. In another embodiment, the gaming system accumulates modified quantities of triggering symbols for a player upon the generation of one or more triggering symbols occurring in association with a promotion. For example, during a designated promotion time at a gaming establishment, the gaming system accumulates double triggering symbols for a player compared to the quantity of triggering symbols the player would have accumulated during the non-promotion time. In another embodiment, the gaming system accumulates one or more triggering symbols for a player in association with a player purchasing one or more items. For example, in exchange for purchasing a trip to a gaming establishment buffet, the gaming system accumulates one or more triggering symbols for that player.

In another embodiment, accumulated triggering symbols are associated with an expiration date and time. In this embodiment, the gaming system/gaming device is configured to communicate to the player the proximity of the expiration of any stored triggering symbols (i.e., "your triggering symbols will expire at 6:00 am tomorrow"). In one embodiment, such notice of expiration of stored triggering symbols is at the player's currently played gaming device. In another embodiment, such notice of expiration of stored triggering symbols is external from the player's currently played gaming device, such as via e-mail. In different embodiments, triggering symbols accumulated at different times are redeemed in order of expiration (first to expire shows first), or in order of first earned basis.

In another embodiment, the gaming system enables the player the opportunity to modify the quantity of accumulated triggering symbols. In one such embodiment, the gaming system provides a gamble feature, such as a suitable double-up type game, wherein if the player accepts to participate in this feature, the gaming system randomly determines whether to modify, such as double, that player's quantity of accumulated triggering symbols. In this embodiment, if the player is successful in this feature, the gaming system increases, such as doubles, that player's quantity of accumulated triggering symbols. On the other hand, if the player is unsuccessful in this feature, the gaming system decreases, such as halves, that player's quantity of accumulated triggering symbols.

In one embodiment, each play of a primary game in which a plurality of paylines are wagered on provides the player multiple opportunities to accumulate triggering symbols. For example, for one play of a primary game, a first triggering symbol generating symbol combination on a first payline results in an accumulation of a first quantity of triggering symbols and a second triggering symbol generating symbol combination on a second payline results in an accumulation of a second quantity of triggering symbols. Accordingly, in association with a play of a primary game, a plurality of events may occur which result in a plurality of quantities of triggering symbols accumulated for the player.

In one embodiment, if a player is eliminated from the play of a gaming system triggered bonus game (i.e., the player is eliminated from a player of a gaming system accumulation game or the player does not place the winning bid in the gaming system auction sequence), the player is automatically enrolled in the next available gaming system triggered bonus game. In one such embodiment, any triggering symbol accumulated for the player between gaming system triggered bonus games are tracked and accounted for with the player's next played gaming system triggered bonus game.

In one embodiment, the gaming system determines that each player that is not already participating in another gaming system triggered bonus game is eligible to participate in an initiated gaming system triggered bonus game. For example, a player that was recently eliminated from one gaming system accumulation game (as described above) is determined eligible to participate in the next initiated gaming system accumulation game. In different embodiments, the determination of if a player is eligible to participate in a gaming system triggered bonus game is predetermined, randomly determined, determined based on a player's status (such as determined through a player tracking system), determined based on one or more generated symbols or symbol combinations, determined based on one or more random determinations by the central controller, determined based on one or more gaming device random determinations, determined based on one or more side wagers placed, determined based on a player's primary game wager, determined based on time (such as the time of day), determined based on an amount of coin-in accumulated in one or more pools or determined based on any other suitable method or criteria.

In another embodiment, upon the initiation of a gaming system triggered bonus game, the gaming system causes each of the currently active gaming devices to be eligible to participate in the initiated gaming system triggered bonus game. In this embodiment, the gaming system determines the status of the gaming devices and provides each gaming device which is in active status a chance to participate in the gaming system triggered bonus game. In this embodiment, upon the triggering of a gaming system triggered bonus game, each gaming device is determined to be in either active status or enrolled or inactive status. Active status means that the gaming device is being actively played by a player, wherein the active status requirements can be based on any suitable number of satisfied criteria or defined in any suitable manner by the implementer of the gaming system. For example, the current level of a gaming device's accumulated wager pool (i.e., is an accumulated wager pool at or above a designated threshold wager level) may be part of the determination of whether that gaming device is in the active status. In another example, a play of or wager on the primary game of the gaming device within a predetermined period of time may be part of the determination of whether that gaming device is in the active status. Other factors such as: (a) the amount of time between each play of or wager on the primary game of the gaming device; (b) the amount being wagered on the primary game(s); and (c) the number of plays within a period of time, may also or alternatively be part of the determination of whether a gaming device is in the active status. On the other hand, inactive status means that the gaming device is not in the active status (i.e., not being actively played by a player according to one or more of the predetermined criteria).

In one embodiment, the gaming system provides one or more gaming system triggered bonus games at the same time to enable players who arrive at different times to not have to wait for an existing gaming system triggered bonus game to finish before joining a new one. In another embodiment, the gaming system provides a separate gaming system triggered bonus game for each group of players with a wagering activity history that meets a threshold of wagering activity history. In another embodiment, the gaming system enables a plurality of players to form a group of players and the gaming system provides a separate gaming system triggered bonus game for the players in the formed group of players. In another embodiment, the gaming system forms one or more groups of players and the gaming system provides a separate gaming system triggered bonus game for the players in a formed group of players. In this embodiment, the gaming system forms such groups of players based on any suitable criteria. In different embodiments, the determination of which players at which gaming devices participate in which separate gaming system triggered bonus game is predetermined, randomly determined, determined based on a player's status (such as determined through a player tracking system), determined based on one or more generated symbols or symbol combinations, determined based on one or more random determinations by the central controller, determined based on one or more gaming device random determinations, determined based on one or more side wagers placed, determined based on a player's primary game wager, determined based on time (such as the time of day), determined based on an amount of coin-in accumulated in one or more pools or determined based on any other suitable method or criteria.

In one embodiment, if a triggering symbol is generated in association with a play of a gaming system triggered bonus game, the quantity of triggering symbols accumulated for the player is based on that player's wager. In another embodiment, if a triggering symbol is generated in association with a play of a gaming system triggered bonus game, the quantity of triggering symbols accumulated for the player is based on that player's player tracking status. In another embodiment, if a designated quantity of triggering symbols are generated in association with a play of a gaming system triggered bonus game, the gaming system accumulates one or more additional triggering symbols for that player. In different embodiments, if a triggering symbol is generated, the quantity of triggering symbols accumulated for the player is predetermined, randomly determined, determined based on one or more generated symbols or symbol combinations, determined based on one or more random determinations by the central controller, determined based on one or more gaming device random determinations, determined based on one or more side wagers placed, determined based on time (such as the time of day), determined based on an amount of coin-in accumulated in one or more pools or determined based on any other suitable method or criteria.

In one embodiment as described herein, if a triggering symbol is generated in association with a play of a primary game, the gaming system accumulates one or more triggering symbols (and maintains such accumulated triggering symbols) for the specific player at the gaming device associated with the generation of the triggering symbol. In this embodiment, such accumulated triggering symbols are associated with the player and may be transferred from gaming device to gaming device. In another embodiment, if a triggering symbol is generated in association with a play of a primary game, the gaming system accumulates one or more triggering symbols (and maintains such accumulated triggering symbols) for the gaming device associated with the generated triggering symbol. In this embodiment, such accumulated triggering symbols are associated with the gaming device and independent of which player may be playing the gaming device at any given point in time.

In another embodiment, an average expected payout of each gaming device bonus game is based on the number of triggering symbols generated in association with the trigger of that bonus game. That is, a first gaming device bonus game that is triggered based on the generation of one triggering symbol has a different average expected payout than a second gaming device bonus game that is triggered based on the generation of two triggering symbols. In this embodiment, for each triggering symbol that is generated, the gaming system contributes an average expected payout of the skipped bonus game to the bonus accumulation pool. For example, if a play of a primary game resulted in the generation of three bonus game triggering symbols (which are associated with a play of a gaming device bonus game with an average expected payout of one-hundred-fifty dollars for the wager placed on the primary game), the gaming system funds the bonus accumulation pool with one-hundred-fifty dollars and accumulates three triggering symbols for the player. In this example, if another play of the primary game resulted in the generation of one bonus game triggering symbol (which is also associated with a play of a gaming device bonus game with an average expected payout of fifty dollars for the wager placed on the primary game), the gaming system funds the bonus accumulation pool with another fifty dollars and accumulates one triggering symbol for the player.

In another embodiment, certain triggering symbol combinations cause the accumulation of a triggering symbol (or a partial triggering symbol) for a player but not the contribution of an amount to the bonus accumulation pool. For example, if a triggering symbol combination that includes one or two triggering symbols is generated, the gaming system accumulates one or more triggering symbols (or a fraction of one triggering symbol) for the player and does not contribute any amount to the bonus accumulation pool. In this example, if a triggering symbol combination that includes more than two triggering symbols is generated, the gaming system accumulates one or more triggering symbols for the player and contributes an amount to the bonus accumulation pool.

In another embodiment, certain triggering symbol combinations cause a contribution to the bonus accumulation pool but not the accumulation of a triggering symbol for a player. For example, if a triggering symbol combination that Includes one or two triggering symbols is generated, the gaming system contributes an amount to the bonus accumulation pool and does not accumulate any triggering symbols for the player. In this example, for the generation of the triggering symbol combination with one or two triggering symbols, the gaming system provides the player an amount of credits for this symbol combination, wherein the amount of credits provided is less than the amount of credits that would be provided to the player if an amount was not also contributed to the bonus accumulation pool.

In one embodiment, after initiating a gaming system accumulation game as described above, the gaming system determines a number of rounds for the initiated gaming system accumulation game. In different embodiments, the number of rounds of each gaming system accumulation game is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In another embodiment, the gaming system randomly determines a number of points for each triggering symbol generated in association with a play of a game during a round of the gaming system accumulation game described above, wherein the player's quantity of points at the end of a round determine if that player will be eliminated from the gaming system accumulation game or offered an accumulation game award.

In one embodiment, an accumulation game round terminating event occurs and/or an auction sequence terminating event occurs based on a displayed event in a play of one or more displayed games of one or more of the gaming devices in the gaming system. In another embodiment, an accumulation game round terminating event occurs and/or an auction sequence terminating event occurs Independent of any displayed event in any play of any game of any of the gaming devices in the gaming system. In another embodiment, the gaming system tracks the occurrences of one or more suitable events occurring at or in association with one or more players and/or one or more gaming devices in the gaming system and determines, based on these tracked events, whether an accumulation game round terminating event has occurred and/or whether an auction sequence terminating event has occurred. In another embodiment, the gaming system defines one or more game play parameters, wherein each time a player's tracked game play activity satisfies the defined parameter, an accumulation game round terminating event occurs and/or an auction sequence terminating event occurs. In different embodiments, the determination of whether an accumulation game round terminating event occurs and/or an auction sequence terminating event occurs is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In another embodiment, the accumulation game award offered to a player for accumulating the target quantity of triggering symbols for a given round of the gaming system accumulation game is based on the current amount in the maintained bonus accumulation pool, the portion of the maintained bonus accumulation pool allocated to the current round and at least one additional factor. In different embodiments, such additional factor is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, if a player rejects an offered accumulation game award, then that player will forfeit any accumulated triggering symbols for the next round of the gaming system accumulation game. In another embodiment, if a player rejects an offered accumulation game award, then that player will keep any accumulated triggering symbols for the next round of the gaming system accumulation game. In another embodiment, if a player rejects an offered accumulation game award, then that player will forfeit a designated quantity of accumulated triggering symbols for the next round of the gaming system accumulation game. In different embodiments, the designated quantity of forfeited accumulated triggering symbols is predetermined, randomly determined, determined based on a player's status (such as determined through a player tracking system), determined based on one or more generated symbols or symbol combinations, determined based on one or more random determinations by the central controller, determined based on one or more gaming device random determinations, determined based on one or more side wagers placed, determined based on a player's primary game wager, determined based on time (such as the time of day), determined based on an amount of coin-In accumulated In one or more pools or determined based on any other suitable method or criteria.

In one embodiment, the above-described gaming system maze game is continuously played wherein one or more players may join the gaming system maze game at any time. In another embodiment, at the start of each player's gaming session, each player enters the maze. In one embodiment, as a player begins playing the gaming system maze game, the player is enabled to select one of a plurality of different starting positions. In another such embodiment, as a player begins playing the maze group bonus, the gaming system determines a starting position for the player in the gaming system maze game. In one embodiment, as a player is playing the gaming system maze game, the player is enabled to select the direction of movement in the maze. In another such embodiment, an automatic option is available regarding the player's direction of movement. In one implementation of the gaming system maze game, one of the displays of the gaming device is used to provide a first person view of the maze and a small overview insert of the entire maze (to show where other players are as well as hints or locations of the gaming system triggered bonus awards).

In another embodiment, the gaming system maintains at least a designated quantity of gaming system triggered bonus awards throughout the gaming system maze game described above, wherein if the quantity of gaming system triggered bonus awards throughout the gaming system maze game falls below this designated quantity (i.e., a plurality of gaming system triggered bonus awards are located), the gaming system adds additional gaming system triggered bonus award throughout the maze. In this embodiment, such additional gaming system triggered bonus awards are funded by amounts contributed to the bonus accumulation pool.

In another embodiment, the gaming system maze game described above includes a plurality of different bonus event collectors, wherein each move the player makes in the gaming system maze game is associated with a random award determination. In this embodiment, if the player reaches a bonus event collector in the gaming system maze game, the amount of the reached gaming system triggered bonus award is based on the current amount in the bonus accumulation pool and the results of the random award determinations associated with the moves the player used to reach that bonus event collector. In another embodiment, the gaming system maze game includes a plurality of different bonus event collectors wherein if a player collects a bonus event collector, the amount of the gaming system triggered bonus award provided to the player is based on the current amount in the bonus accumulation pool and the quantity of triggering symbols exchanged for moves in the maze.

In another embodiment wherein the gaming system maze game is an ongoing bonus event, the gaming system simultaneously maintains a plurality of mazes. In one such embodiment, the gaming system maintains a plurality of different mazes, wherein one or more mazes are each accessible by players of at least a designated player tracking level. For example, gold status players may participate in the gold gaming system maze game and platinum status players may participate in the platinum gaming system maze game. In another such embodiment, the gaming system maintains a plurality of different mazes having different available awards and/or different configurations.

In another embodiment, the gaming system maintains separate mazes for separate groups of players to play together. For example, the gaming system maintains a maze for a plurality of employees of a designated corporation wherein the employees participate in this gaming system maze game together. In one such embodiment, the gaming system enables a plurality of players to play the gaming system maze game as a group, wherein if a designated quantity of the gaming system triggered bonus awards in the maze are located, the group of players continues on to another maze.

In another embodiment, the gaming system limits the number of players that may be participating in a designated maze at a given point in time. In one such embodiment, if the number of players participating in a designated maze (or attempting to participate in a designated maze) reaches a threshold, the gaming system initiates a new maze for one or more of such players to participate in. In another such embodiment, if the number of players participating in a designated maze (or attempting to participate in a designated maze) reaches a threshold, the gaming system employs a lobby or waiting room for players waiting to play in that maze.

Information Provided to Player

As indicated above, the gaming system bonus awards may be provided to the players of the gaming machines with or without explanation or information provided to the player, or alternatively information can be displayed to the player. In one embodiment, suitable information about these bonus awards can be provided to the players through one or more displays on the gaming machines or additional information displays positioned near the gaming machines, such as above a bank of system gaming machines.

This information can be used to entertain the player or inform the player that a gaming system bonus has occurred or will occur. Examples of such information are:

(1) that a gaming system bonus has occurred;

(2) that a gaming system bonus will shortly occur (i.e., foreshadowing the providing of a gaming system bonus award);

(3) that one or more gaming system bonus awards have been provided to one or more players of the gaming machines;

(4) which gaming machines have won the gaming system bonus awards;

(5) the amount of the gaming system bonus awards won;

(6) the highest gaming system bonus award won;

(7) the lowest gaming system bonus award won;

(8) the average gaming system bonus award won;

(9) number of games played/total time since the last gaming system bonus award was won;

(10) the average time between gaming system bonus awards being hit;

(11) the number of gaming system bonus awards won in a designated time period;

(12) the amount of the gaming system bonus awards that can be won;

(13) a player's eligibility status to participate in a gaming system bonus; and

(14) the potential awards or the portion of the potential awards which can be won for the gaming system bonus.

It should be appreciated that such information can be provided to the players through any suitable audio, audio-visual or visual devices.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a plurality of gaming devices, each gaming device including at least one input device;

at least one display device associated with at least one of said gaming devices; and at least one controller configured to operate with each of said gaming devices and said at least one display device to:

(a) maintain a bonus accumulation pool;

(b) for each of any of said gaming devices that generate a designated number of triggering symbols in association with a play of a primary game:

(i) contribute an average expected payout of a gaming device triggered bonus game to the maintained bonus accumulation pool, and (ii) accumulate a quantity of triggering symbols for the player; and (c) for a play of a gaming system triggered bonus game:

(i) enable one of the players to redeem a quantity of accumulated triggering symbols for a gaming system triggered bonus game award, wherein a value of said gaming system triggered bonus game award is based, at least in part, on said quantity of redeemed accumulated triggering symbols, and (ii) cause one of the gaming devices to provide the gaming system triggered bonus game award to the player that redeemed the quantity of accumulated triggering symbols, wherein said gaming system triggered bonus game award is funded by the maintained bonus accumulation pool.

2. The gaming system of claim 1, wherein the at least one controller enables each player with a designated quantity of accumulated triggering symbols to bid an amount of said accumulated triggering symbols in an auction sequence.

3. The gaming system of claim 2, wherein the player that redeems the quantity of accumulated triggering symbols for the gaming system triggered bonus game award is the player that bid the highest amount of said accumulated triggering symbols in the auction sequence.

4. The gaming system of claim 1, wherein the value of said gaming system triggered bonus game award is based, at least in part, on a randomly determined value for each redeemed accumulated triggering symbol.

5. The gaming system of claim 4, wherein the value of said gaming system triggered bonus game award is based, at least in part, on a portion of the maintained bonus accumulation pool.

6. The gaming system of claim 1, wherein the at least one controller causes any of said gaming devices that generated the designated number of triggering symbols to skip the gaming device triggered bonus game.

7. A gaming system comprising:

a plurality of gaming devices, each gaming device including at least one input device;

at least one display device associated with at least one of said gaming devices; and at least one controller configured to operate with each of said gaming devices and said at least one display device to:

(a) maintain a bonus accumulation pool;

(b) for each of said gaming devices, cause said gaming device to enable the player of said gaming device to bid a quantity of any accumulated triggering symbols for a gaming system triggered bonus game award in an auction bidding sequence, wherein prior to a termination of the auction bidding sequence, a value of the gaming system triggered bonus game award is unknown;

(c) cause said gaming devices to each display a current winning bid;

(d) repeat (b) to (c) until the termination of the auction bidding sequence occurs; and (e) after the termination of the auction bidding sequence:

(i) determine which of any of the bid quantities of triggering symbols is a final winning bid, and (ii) cause the gaming device of the player that placed the final winning bid to provide the gaming system triggered bonus game award, wherein a provided value of said gaming system triggered bonus game award is based, at least in part, on said final winning bid, and said gaming system triggered bonus game award is funded by the maintained bonus accumulation pool.

8. The gaming system of claim 7, wherein the provided value of said gaming system triggered bonus game award is based, at least in part, on a randomly determined value for each accumulated triggering symbol of the final winning bid.

9. The gaming system of claim 8, wherein the provided value of said gaming system triggered bonus game award is based, at least in part, on a portion of the maintained bonus accumulation pool.

10. A gaming system comprising:

a plurality of gaming devices, each gaming device including at least one input device;

at least one display device associated with at least one of said gaming devices; and at least one controller configured to operate with each of said gaming devices and said at least one display device to:

(a) maintain a bonus accumulation pool;

(b) for each of any of said gaming devices that generate a designated number of triggering symbols in association with a play of a primary game:

(i) contribute an average expected payout of a gaming device triggered bonus game to the maintained bonus accumulation pool, and (ii) accumulate a quantity of triggering symbols for the player; and (c) for a play of a gaming system triggered bonus game:

(i) enable a plurality of the players to each redeem a quantity of any accumulated triggering symbols, (ii) select at least one of said plurality of the players, wherein for each player, said selection is based on said player's quantity of any redeemed accumulated triggering symbols, and (iii) display and provide a gaming system triggered bonus game award to any selected players, wherein said gaming system triggered bonus game award is funded by the maintained bonus accumulation pool.

11. The gaming system of claim 10, wherein a value of the gaming system triggered bonus game award is based on a value of the maintained bonus accumulation pool and the quantity of players selected.

12. The gaming system of claim 10, wherein the at least one controller enables each selected player to accept or reject any displayed gaming system triggered bonus game award.

13. The gaming system of claim 12, wherein if any selected player rejects any displayed gaming system triggered bonus game award, the at least one controller causes a value of said rejected gaming system triggered bonus game award to be returned to the maintained bonus accumulation pool.

14. The gaming system of claim 10, wherein the at least one controller selects at least one of the players based on if a target quantity of triggering symbols are accumulated for that player.

15. The gaming system of claim 10, wherein the at least one controller repeats (c) for each of a plurality of rounds of a multi-round accumulation game.

16. The gaming system of claim 10, wherein if one of the gaming devices generates the at least one triggering symbol, the quantity of triggering symbols accumulated for the player is based on that player's wager on the primary game.

17. The gaming system of claim 10, wherein the at least one controller causes any of said gaming devices that generated the designated number of triggering symbols to skip the gaming device triggered bonus game.

18. A gaming system comprising:

a plurality of gaming devices, each gaming device including at least one input device;

at least one display device associated with at least one of said gaming devices; and at least one controller configured to operate with each of said gaming devices and said at least one display device to:

(a) maintain a bonus accumulation pool;

(b) for each of any of said gaming devices that generate a designated number of triggering symbols in association with a play of a primary game:

(i) contribute an average expected payout of a gaming device triggered bonus game to the maintained bonus accumulation pool, and (ii) accumulate a quantity of triggering symbols for the player; and (c) for a play of a gaming system triggered bonus game:

(i) select one of the players to provide a gaming system triggered bonus game award, wherein said determination is based on a rate the selected player has accumulated triggering symbols over a designated period of time, and (ii) provide the selected player the gaming system triggered bonus game award, wherein said gaming system triggered bonus game award is funded by the maintained bonus accumulation pool.

19. The gaming system of claim 18, wherein the at least one controller selects a plurality of players for the play of the gaming system triggered bonus game.

20. The gaming system of claim 19, wherein each selected player is provided a gaming system triggered bonus game award that is based on a portion of the maintained bonus accumulation pool.

21. The gaming system of claim 18, wherein the at least one controller causes the display of the play of the gaming system triggered bonus game as a maze game.

22. The gaming system of claim 18, wherein the at least one controller causes any of said gaming devices that generated the designated number of triggering symbols to skip the gaming device triggered bonus game.

* * * * *

UNITED STATES PATENT AND TRADEMARK OFFICE

CERTIFICATE OF CORRECTION

PATENT NO. : 7,976,379 B2
APPLICATION NO. : 12/268841
DATED : July 12, 2011
INVENTOR(S) : Anthony J. Baerlocher It is certified that error appears in the above-identified patent and that said Letters Patent is hereby corrected as shown below:

IN THE CLAIMS:

In column 56, Claim 1, lines 18 to 19, replace “the player” with --one of a plurality of players--.

In column 56, Claim 7, line 64, replace “the player” with --a player--.

In column 57, Claim 10, lines 40 to 41, replace “the player” with --one of a plurality of players--.

In column 58, Claim 18, lines 34 to 35, replace “the player” with --one of a plurality of players--.

In column 58, Claim 19, line 47, between “of” and “players” add --the--.

Signed and Sealed this
Thirtieth Day of October, 2012

David J. Kappos

David J. Kappos
*Director of the United States Patent and Trademark Office*